(12) United States Patent
Shirai et al.

(10) Patent No.: US 6,328,394 B1
(45) Date of Patent: Dec. 11, 2001

(54) PRINTING APPARATUS

(75) Inventors: Masahiro Shirai; Katsunori Ohe, both of Chichibu (JP)

(73) Assignee: Canon Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/167,980

(22) Filed: Oct. 8, 1998

(30) Foreign Application Priority Data

Oct. 16, 1997 (JP) .................................................. 9-299574
Oct. 16, 1997 (JP) .................................................. 9-299575
Oct. 16, 1997 (JP) .................................................. 9-299576

(51) Int. Cl.$^7$ .................................. B41J 3/00; B41J 2/01
(52) U.S. Cl. .................................. 347/2; 347/4; 347/104
(58) Field of Search .................................. 347/16, 104, 2, 347/4, 5, 105, 106; 399/2; 101/329, 486; 400/83, 356, 582, 636, 692, 693, 708; 271/4.01, 4.02, 4.03, 10.02, 10.03, 270

(56) References Cited

U.S. PATENT DOCUMENTS

| | | | |
|---|---|---|---|
| 5,186,449 | * | 2/1993 | Ohmi et al. ................. 271/10.03 |
| 5,503,070 | * | 4/1996 | Cheerver et al. ................. 101/486 |
| 5,761,565 | * | 6/1998 | Baker et al. ................. 399/2 |
| 5,781,823 | * | 7/1998 | Isobe et al. ................. 399/2 |
| 5,988,905 | * | 11/1999 | Abe et al. ................. 400/708 |

FOREIGN PATENT DOCUMENTS 0 291 473    11/1988   (EP) .

* cited by examiner

Primary Examiner—John Barlow
Assistant Examiner—An H. Do
(74) Attorney, Agent, or Firm—Fitzpatrick, Cella, Harper & Scinto

(57) ABSTRACT

The present invention provides a printing apparatus which can detachably mounted to a main machine and which is driven by a drive source independently from the main machine and is adapted to effect printing of a sheet conveyed from the main machine apparatus body, the printing apparatus having a sheet detect mechanism for detecting presence/absence of the sheet conveyed from the main machine, a sheet convey mechanism disposed at a downstream side of the sheet detect mechanism in a conveying direction within a sheet convey path, a print mechanism for effecting printing on the sheet conveyed by the sheet convey mechanism, and a drive control mechanism for controlling driving of the sheet convey mechanism and the print mechanism on the basis of a sheet detect signal from the sheet detect mechanism.

15 Claims, 19 Drawing Sheets

CONVEY DIRECTION
OF RECORDED SHEET

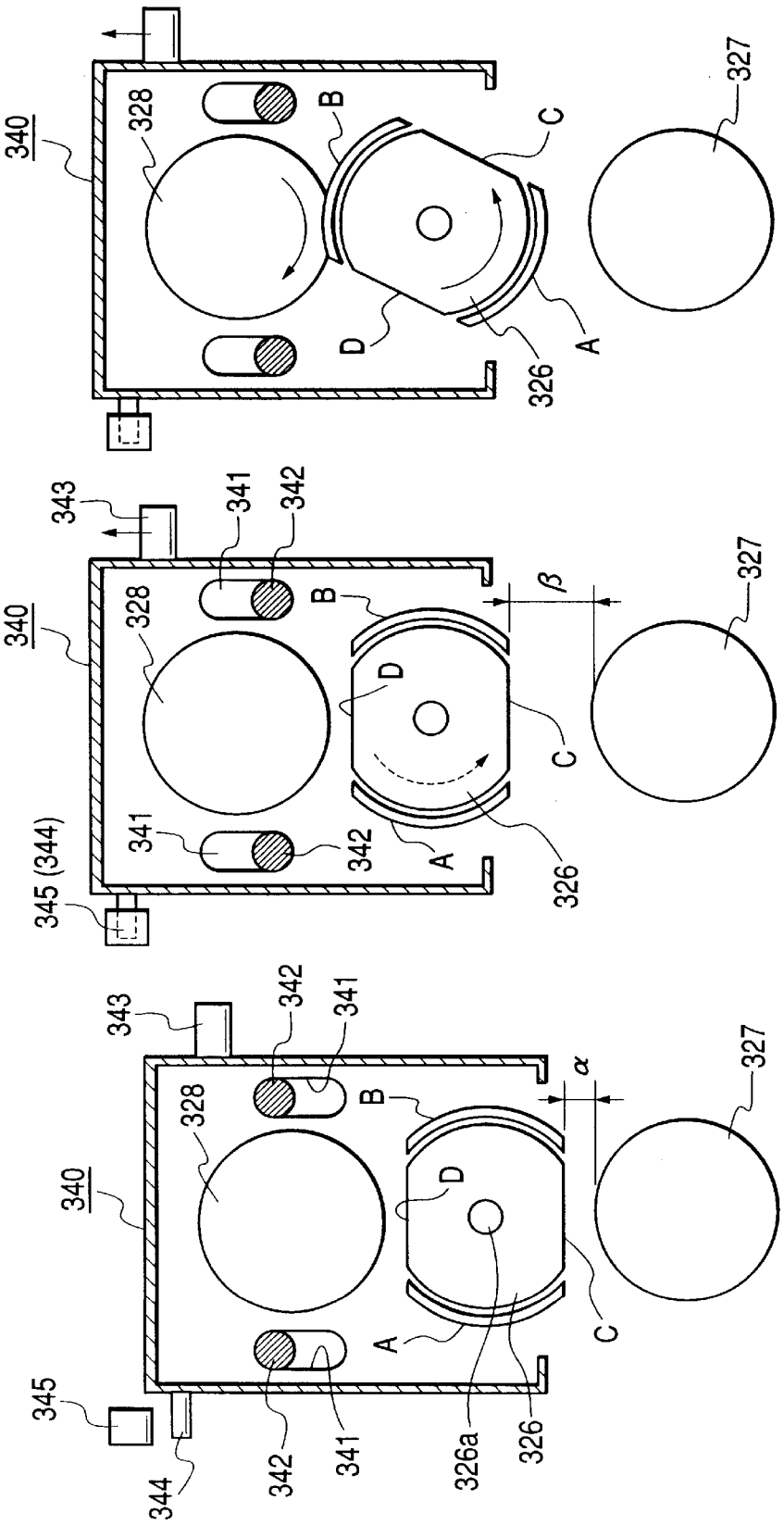

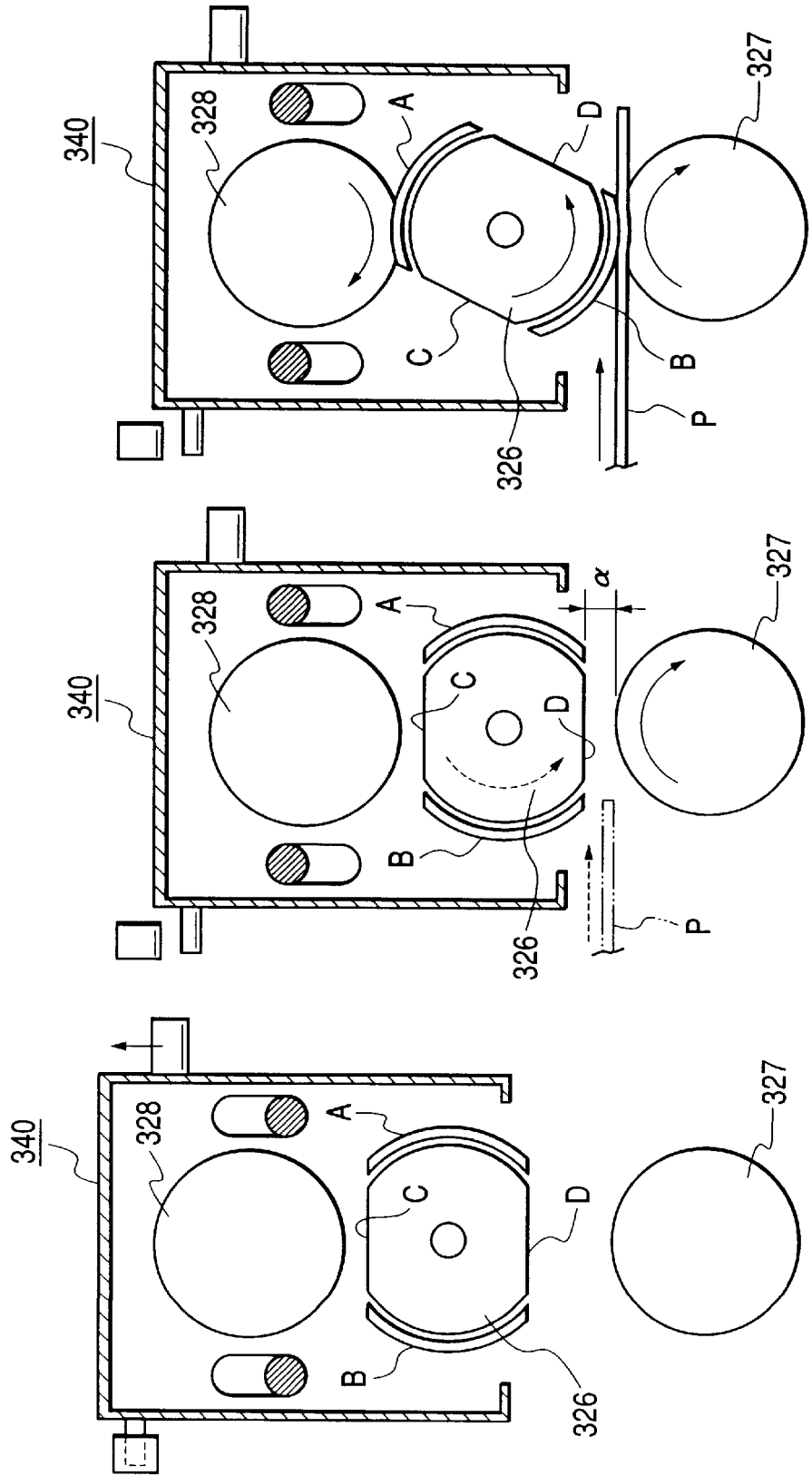

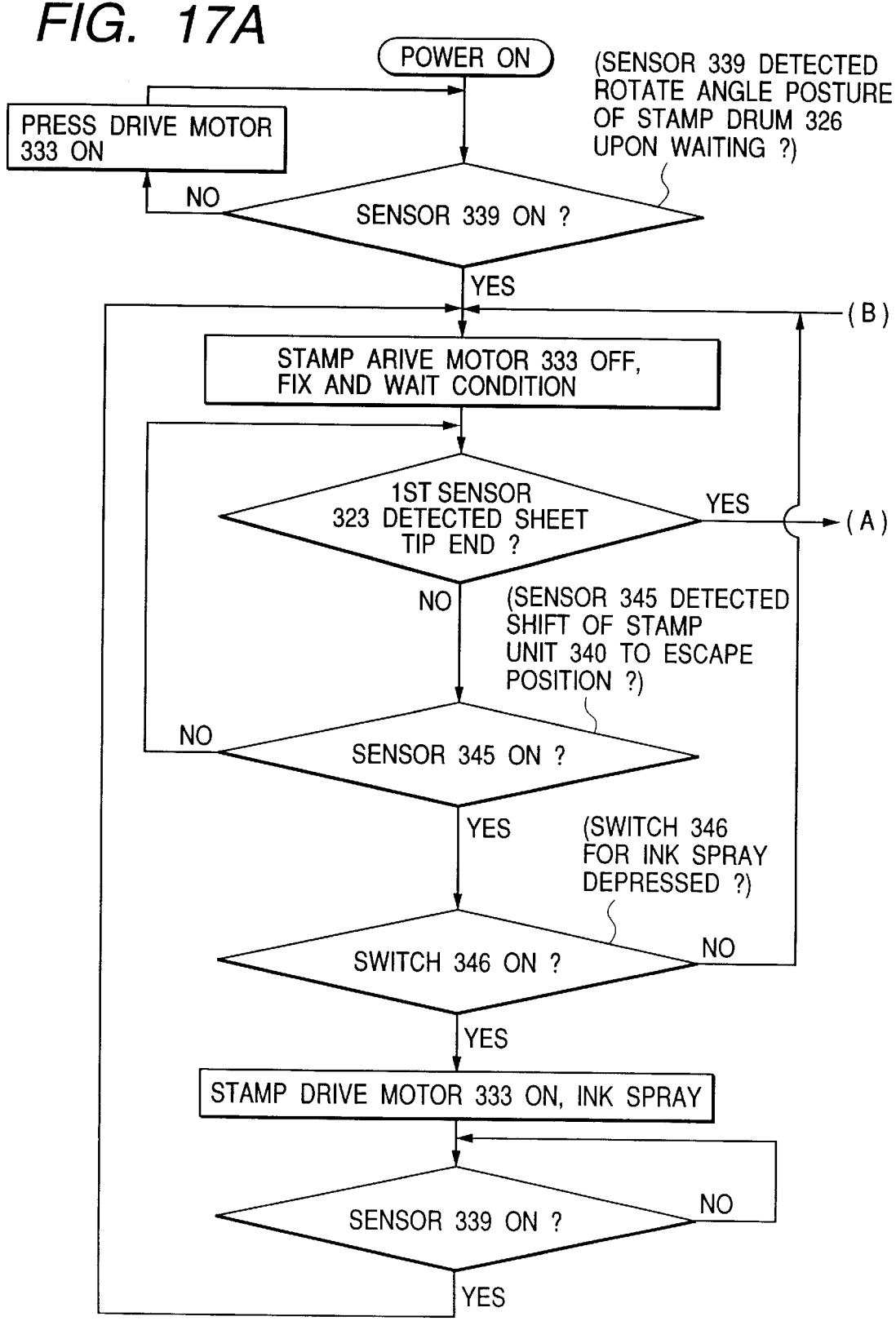

PRINTING APPARATUS

BACKGROUND OF THE INVENTION

1. Field of the Invention

The present invention relates to a printing apparatus which can detachably mounted to an image processing apparatus (referred to as "main machine" hereinafter) such as an image recording apparatus, an image reading apparatus or the like as an option equipment and which is adapted to print predetermined information on a sheet (continuous sheet, card, cut sheet or the like) discharged from the main machine when mounted to the main machine.

2. Related Background Art

In the past, for example, in banking facilities such as banks and security companies, image information on a sheet-shaped original such as a bill, a check, a share and the like has been treated (recorded and preserved) by an image recording apparatus such as a microfilmer, an image scanner or the like.

Further, in order to prove the fact that the predetermined treatment has been performed, in respective banking facilities, contents such as a name and a branch number of a receiving and treating facility, a treatment code, a date and the like are generally stamped (printed) on a rear surface of the treated (recorded) original. To this end, in some image recording apparatuses, there is further provided a stamping apparatus in which the above-mentioned contents are automatically stamped on the treated (recorded) original passed through a recording portion of the image recording apparatus, so that a "treated" mark and/or additional information can be stamped on the treated original on demand.

FIG. 18 schematically shows an example of such an image recording apparatus 10. A stamping apparatus 13 is an option equipment which can detachably mounted to the image recording apparatus 10 optionally by a user and is mechanically and electrically connected to a sheet discharge opening 19 of the image recording apparatus 10. In a condition that the stamping apparatus 13 is mounted to the image recording apparatus 10, a sheet supply opening 20 of the stamping apparatus 13 is connected to the sheet discharge opening 19 of the image recording apparatus 10 to communicate both apparatuses 10, 13 with each other.

In the image recording apparatus 10, sheet-shaped originals (referred to as "sheets" hereinafter) P such as bills, checks or shares are stacked on a sheet supply tray 1. When a record start key (not shown) is depressed, the sheets (originals) P stacked on the tray 1 are separated one by one by means of a sheet supply roller 2 and a separation roller 3 and are successively supplied within the apparatus. The supplied sheet is conveyed at a predetermined speed through a sheet convey path (within the apparatus) constituted by pairs of convey rollers 4, 5, 7, and 8, and guide members.

While the separated sheet P is being conveyed between the pairs of convey rollers 5 and 7, image information on the sheet P is record-treated by a recording portion 6. The recording portion 6 comprises a reduction projection optical system or a photo-electrical conversion reading system and serves to record the image information on the conveyed sheet P on an electrical recording medium such as a microfilm, an optical disc or a magnetic disc.

The recorded sheet P passed through the recording portion 6 passes through the pairs of convey rollers 7, 8 and is introduced into the stamping apparatus 13 connected to the original discharge opening of the image recording apparatus 10. The recorded sheet P introduced into the stamping apparatus 13 is further conveyed at a predetermined speed through a sheet convey path (within the stamping apparatus 13) constituted by pairs of convey rollers 14, 17 and guide members. While the sheet P is being conveyed between the pairs of convey rollers 14 and 17, when the sheet is passed between a stamp portion 15 (disposed between the roller pairs 14 and 17) and a platen roller 16 opposed to the stamp portion, the contents is stamped on the surface of the sheet P. For example, the stamp portion 15 comprises a stamp printing mechanism including a stamp drum or an ink jet head.

In this way, the recorded and stamped sheets P'are successively discharged from a sheet discharge opening 21 of the stamping apparatus 13 onto a sheet discharge tray 18.

In the image recording apparatus 10, within the sheet convey path, between the pairs of rollers 4 and 5 disposed at an upstream side of the recording portion 6 in a sheet conveying direction, a sheet detect sensor 9 is disposed so that a sheet tip end detect signal from the sensor 9 is inputted to a control circuit 11 of the image recording apparatus 10. The control circuit 11 serves to control a record start timing of the recording portion 6 of the image recording apparatus and a stamp start timing of the stamp portion 15 of the stamping apparatus 13 on the basis of inputted signal.

The rollers 2, 3, 4, 5, 7 and 8 of the image recording apparatus 10 are driven by a drive motor 12 disposed within the image recording apparatus 10 through drive transmitting means (not shown) such as belts and/or gears. The rollers 14, 16 and 17 of the stamping apparatus 13 are connected to the drive motor 12 disposed within the image recording apparatus 10 through drive transmitting means (not shown) such as belts and/or gears and are driven at a speed synchronous with a sheet conveying speed of the rollers of the image recording apparatus by means of the drive motor 12 of the image recording apparatus 10.

Although it is desirable that the conventional stamping apparatus 13 as the option equipment as mentioned above can easily be mounted and dismounted with respect to the image recording apparatus (main machine) by the user and can be used in a correctly mounted condition, since the stamping machine must be mechanically and electrically connected to the image recording apparatus 10 exactly, such connection must be effected by an expert. That is to say, in the conventional stamping apparatus 13, since the stamp start timing is controlled on the basis of the sheet detect signal from the sheet detect sensor 9 of the image recording apparatus 10, it is difficult that the electrical connection between the stamping apparatus and the image recording apparatus 10 is omitted.

In order that the stamping apparatus as the option equipment can easily be mounted and dismounted with respect to the image recording apparatus 10 by the user without any expert, it is required that special mechanical and electrical connections (between the image recording apparatus and the stamping apparatus 13) for transmission of drive and signals are omitted. And, to this end, it is desirable that the stamping apparatus 13 also has a drive source so as to drive the stamping apparatus by a power source different from that of the image recording apparatus 10.

However, if the power source and associated power source switch of the stamping apparatus 13 are provided independently from those of the image recording apparatus 10, when the system is used, since the power source switch of the image recording apparatus 10 must be turned ON and at the same time the power source switch of the stamping apparatus 13 must be turned ON, the operation becomes complicated. And, it is apt to forget to turn ON the power source switch of the stamping apparatus 13.

If only the image recording apparatus 10 is driven to convey the sheet P while keeping the stamping apparatus 13 OFF, the recorded sheet P introduced from the image recording apparatus 10 into the stamping apparatus 13 is jammed without fail at a junction between the image recording apparatus 10 and the stamping apparatus 13 since the convey rollers of the stamping apparatus 13 are not driven. In such a case, since the sheet (original) P is an important document such as a bill, a check or the like, it is not preferable that the sheet is folded or damaged due to the sheet jam.

Further, in the image recording apparatus 10, generally, a reading speed of the sheet P, i.e., sheet conveying speed is changed to change (on demand) a reading resolving power of the image on the sheet at the recording portion 6 in a sub-scan direction (sheet conveying direction) of the image, and, also in the stamping apparatus 13 connected to the image recording apparatus 10, the sheet conveying speed and the stamp start timing of the stamping apparatus must be changed in accordance with the sheet discharging speed from the image recording apparatus 10. However, it is very difficult to effect such change without special mechanical and electrical connections between the image recording apparatus and the stamping apparatus.

SUMMARY OF THE INVENTION

A first object of the present invention is to provide a stamping apparatus as an option equipment which detachably mounted to a main machine such as an image recording apparatus and in which special mechanical and electrical connections to existing main machine such as an image recording apparatus are not required so that any user can mount and dismount the stamping apparatus with respect to the main machine and can use the stamping apparatus in a correctly mounted condition.

Further, the present invention aims to provide a stamping apparatus which can improve operability and can prevent occurrence of sheet jam caused by forgetting power ON of a power source.

A second object of the present invention is to provide a stamping apparatus as an option equipment which detachably mounted to a main machine such as an image recording apparatus and in which a sheet conveying speed of the stamping apparatus and a drive start timing of a stamp means can be changed in accordance with a sheet conveying speed of the main machine such as the image recording apparatus.

Further, the present invention aims to provide a stamping apparatus which can be made compact and in which, if a sheet conveyed from a main machine such as an image recording apparatus is jammed, a jammed condition can be detected easily and simply and the jammed condition can be displayed.

To achieve the above objects, according to the present invention, there is provided a stamping (print) apparatus which can detachably be mounted to a main machine such as an image recording apparatus and which is driven by a drive source independently from the main machine and is adapted to print a sheet conveyed from the main machine, comprising a sheet detect means for detecting presence/absence of the sheet conveyed from the main machine, a sheet convey means disposed at a downstream side of the sheet detect means in a sheet conveying direction within a sheet convey path, a print means for effecting print on the sheet conveyed by the sheet convey means, and a drive control means for controlling driving of the sheet convey means and the print means on the basis of a sheet detect signal from the sheet detect means.

That is to say, the stamping (print) apparatus as an option equipment according to the present invention which can be mounted and dismounted with respect to the main machine such as an image recording apparatus is driven by the drive source independently from the main machine and controls the driving of the sheet convey means and the stamp (print) means on the basis of the sheet detect signal from the sheet detect means for detecting presence/absence of the sheet conveyed from the main machine. Thus, special mechanical and electrical connections (between the image recording apparatus and the stamping apparatus 13) for transmission of drive and signals can be omitted. Accordingly, a user can mount and dismount the stamping apparatus with respect to the main machine such as an image recording apparatus without any expert and can use the stamping apparatus in a correctly mounted condition.

Further, to achieve the above objects, according to the present invention, there is provided a stamping (print) apparatus which can detachably be mounted to a main machine such as an image recording apparatus and which is driven by a drive source independently from the main machine and is adapted to print a sheet conveyed from the main machine, comprising a first sheet detect means for detecting a sheet conveyed from the main machine, a second sheet detect means disposed at a downstream side of the first sheet detect means in a sheet conveying direction and spaced apart from the first sheet detect means by a predetermined distance, a sheet convey means disposed at a downstream side of the second sheet detect means in the sheet conveying direction, a print means for effecting print on the sheet conveyed by the sheet convey means, and a drive control means for controlling driving of the sheet convey means and the print means. Wherein, the drive control means detects a sheet conveying speed conveyed from the main machine by measuring a time period from when a first output signal is outputted from the first sheet detect means to when a second output signal is outputted from the second sheet detect means sets a driving speed of the sheet convey means and a drive timing of the print means in accordance with the detected speed, thereby controlling driving of the sheet convey means and the print means.

That is to say, the stamping (print) apparatus as an option equipment according to the present invention which can be mounted and dismounted with respect to the main machine such as an image recording apparatus has the drive source independently from the main machine and detects the fact that the sheet is introduced from the main machine such as an image recording apparatus and the conveying speed of the introduced sheet by two (first and second) sheet detect means of the stamping apparatus and sets the driving speed of the sheet convey means and the drive timing and driving speed of the print means on the basis of the detected information, thereby controlling the driving of the sheet convey means and the print means. Thus, special mechanical and electrical connections (between the image recording apparatus and the stamping apparatus 13) for transmission of drive and signals can be omitted. Accordingly, a user can mount and dismount the stamping apparatus with respect to the main machine such as an image recording apparatus without any expert and can use the stamping apparatus in a correctly mounted condition.

BRIEF DESCRIPTION OF THE DRAWINGS

FIGS. 16A, 16B, 16C, 16D, 16E and 16F are explanatory views for explaining ink coating steps to the stamp drum and a stamp operation;

FIG. 17A is a main operation control flow chart (No. 1);

DETAILED DESCRIPTION OF PREFERRED EMBODIMENTS

The present invention will now be explained in connection with embodiments thereof with reference to the accompanying drawings.

(1) Image Recording Apparatus 100

Figure 1:
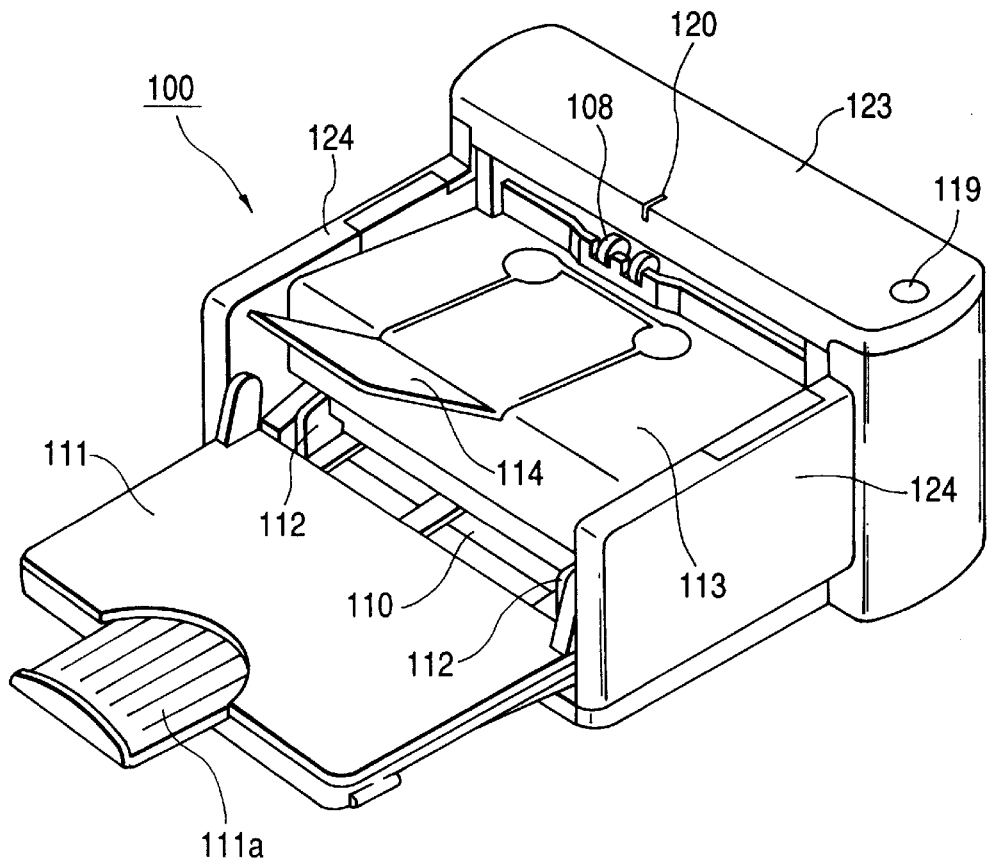
FIG. 1 is a perspective view of an image recording apparatus according to an embodiment of the present invention.
Figure 4:
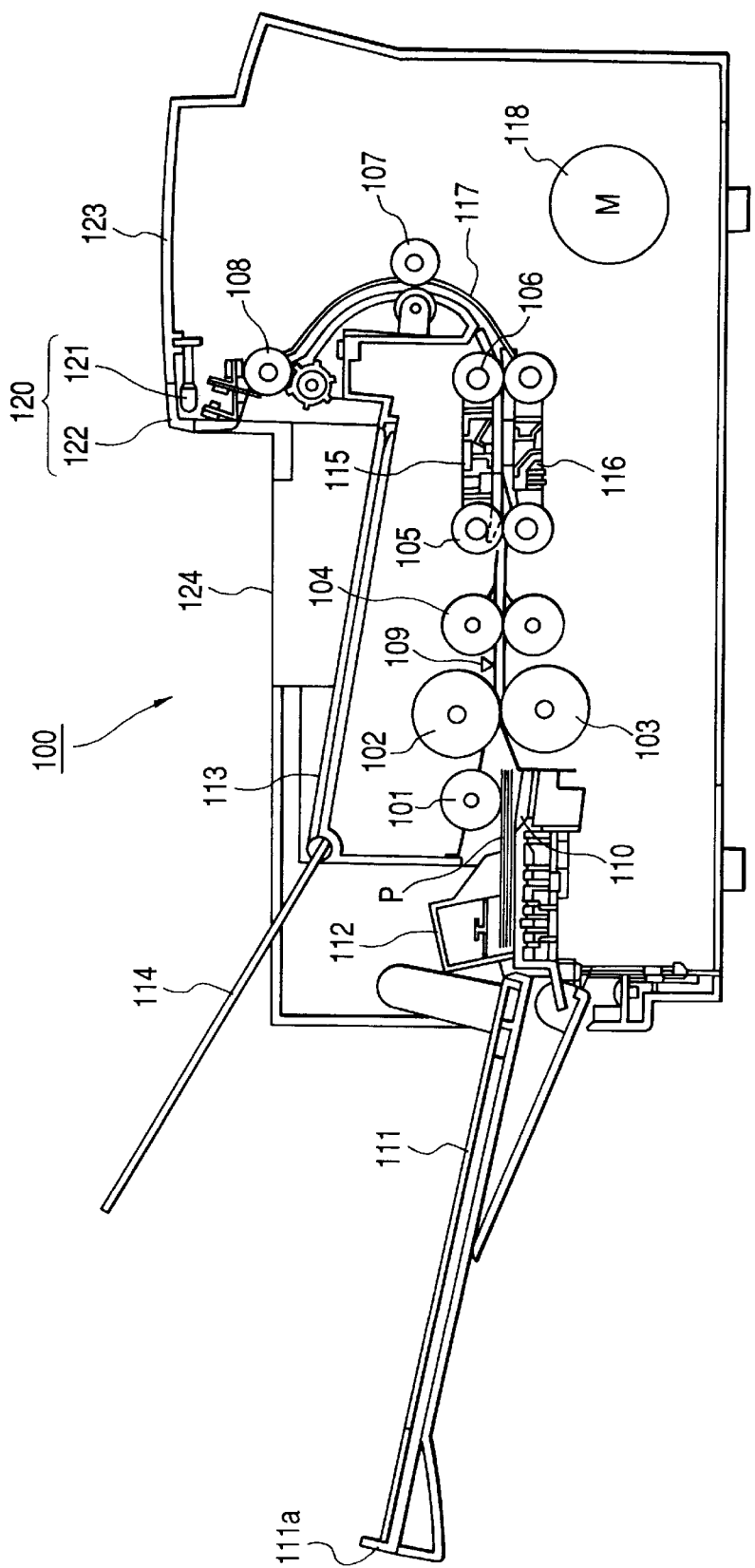
FIG. 4 is a sectional side view of the image recording apparatus.

FIG. 1 is a perspective view of an image recording apparatus 100, and FIG. 4 is a sectional side view of the image recording apparatus.

The image recording (record) apparatus 100 is connected to a commercial power source via a code (not shown) to receive electric power. When a power source switch 119 is turned ON, the image recording apparatus 100 becomes a usable condition, in which a power display portion 120 disposed at an upper central portion of a body of the image recording apparatus 100 is lightened to display the fact that the power source switch of the image recording apparatus 100 is turned ON. The power display portion 120 is constituted by an LED lamp 121, and a transparent window member 122 provided on an upper cover 123 (of the body of the apparatus) for covering the lamp.

Left and right guide regulating plates (side guides) 112 are provided on an original supply plate 110 disposed at a front portion of the image recording apparatus 100 and can be slid in a direction perpendicular to a sheet conveying direction.

A sheet supply tray 111 extends forwardly from the front side of the image recording apparatus 100 and can be detached from the image recording apparatus 100 when it is not used. An auxiliary tray 111a for aiding the expansion of the sheet supply tray 111 can be extended and retracted with respect to the sheet supply tray 111.

Sheets (originals) P such as bills, checks and the like are stacked on the original supply plate 110 and lateral sides of the sheets are regulated and aligned by the left and right guide regulating plates 112. When the sheets P have large sizes, the sheets are stacked on both the original supply plate 110 and the sheet supply tray 111. When the sheets are further large, the auxiliary tray 111a is extended to expand the sheet supply tray 111.

When a record start key (not shown) is depressed, an uppermost sheet on the sheet stack P is fed out by a sheet supply roller 101, and only the uppermost sheet is separated from the other sheets by a feed roller 102 and a separation roller 103 (roller pair). The separated sheet is conveyed at a predetermined speed through a sheet convey path (within the image recording apparatus 100) constituted by a pair of regist rollers 104, a pair of first nip rollers 105, a pair of second nip rollers 106, a convey roller 107, a discharge roller 108 and a convey guides 117. A downstream portion of the sheet convey path from the second nip roller pair 106 forms a U-turn (U-shaped) convey path directed toward a discharge portion 113 provided on an upper surface of the body of the image recording apparatus 100. Accordingly, the sheet conveyed through the sheet convey path is discharged from the discharge roller 108 onto the discharge portion 113.

An open/close discharge tray 114 can be folded onto the discharge portion 113, and, as shown, when the tray 114 is opened (from the discharge portion 113), the discharge portion 113 is expanded to cope with the larger size sheet.

In the sheet convey path, between the first and second nip roller pairs 105 and 106, there are provided first (upper) and second (lower) image reading portions 115 and 116 with the interposition of the sheet convey path. Accordingly, while the sheet conveyed through the sheet convey path is being passed between the first and second image reading portions 115 and 116, image on both surfaces of the sheets are read. In the illustrated embodiment, the first and second image reading portions 115 and 116 are constituted by photoelectric units in which the images on both surfaces of the sheets are read photo-electrically and are converted into electric signals which are in turn recorded in a record device (not shown) such as an optical disc, a magnetic disc or the like.

The various rollers within the image recording apparatus 100 are driven by a motor (drive source) 118 through power transmitting systems (not shown). A sheet detect sensor 109 is disposed between the pair of feed/separation rollers 102, 103 and the pair of regist rollers 104 in the sheet convey path, and a sheet detect signal from the sensor 109 is inputted to a control circuit (not shown). The control circuit serves to control a drive start timing of the regist roller pair 104 and a read start timings of the image reading portions 115, 116 on the basis of the inputted signal (sheet detector signal).

In this way, the sheets P stacked on the image recording apparatus 100 are successively separated and supplied one by one, and image reading and record processing are successively carried out regarding all of the sheets, and the recorded sheets are successively discharged onto the discharge portion 113 (and discharge tray 114).

(2) Stamping Apparatus 200

Figure 2:
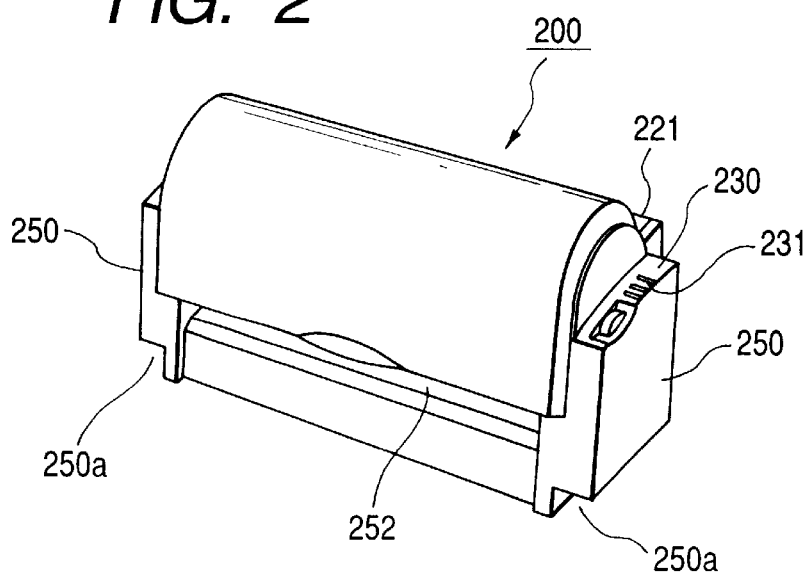
FIG. 2 is a perspective view of a stamping apparatus according to an embodiment of the present invention.
Figure 3:
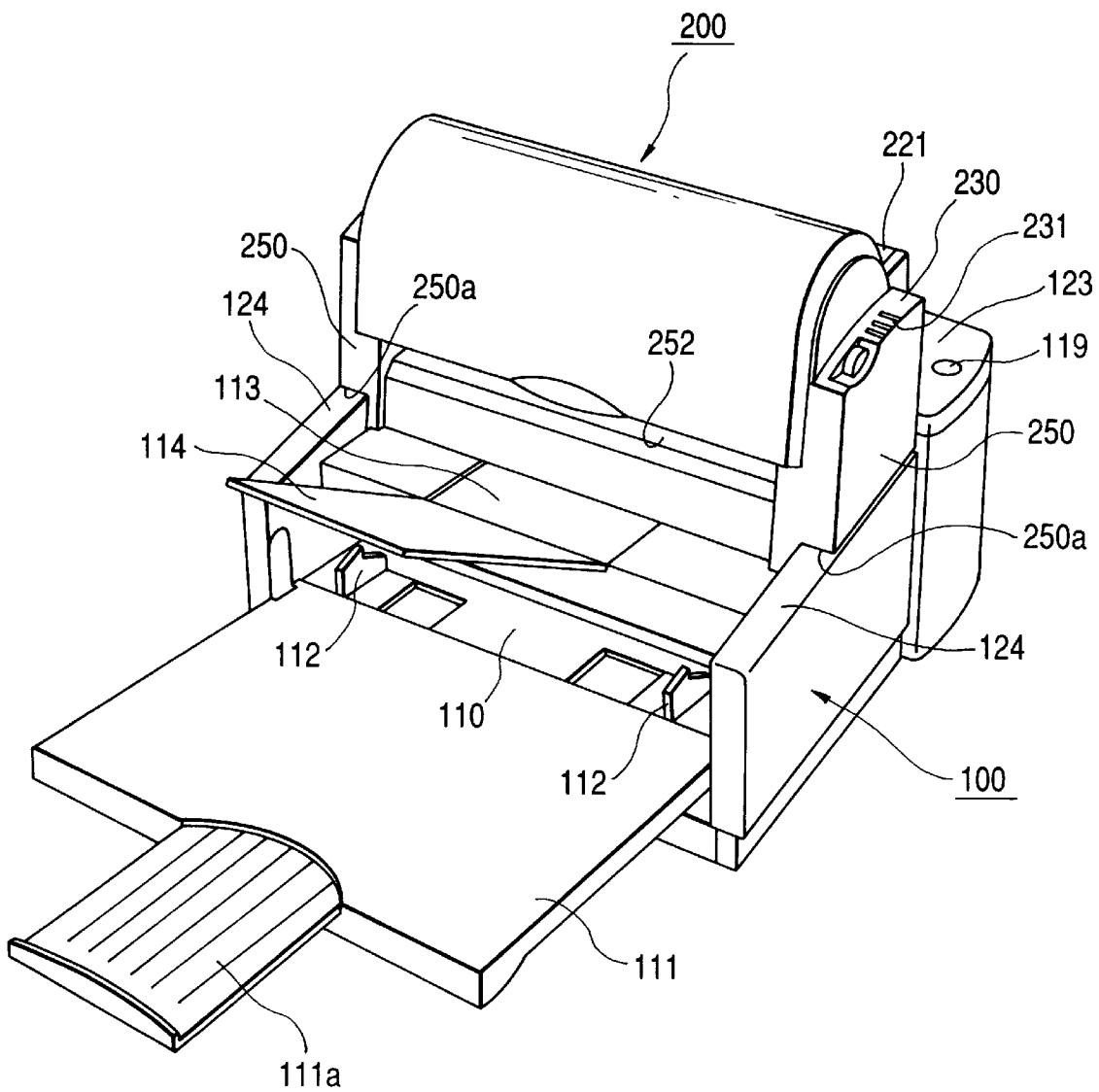
FIG. 3 is a perspective view of the image recording apparatus to which the stamping apparatus was mounted.
Figure 5:
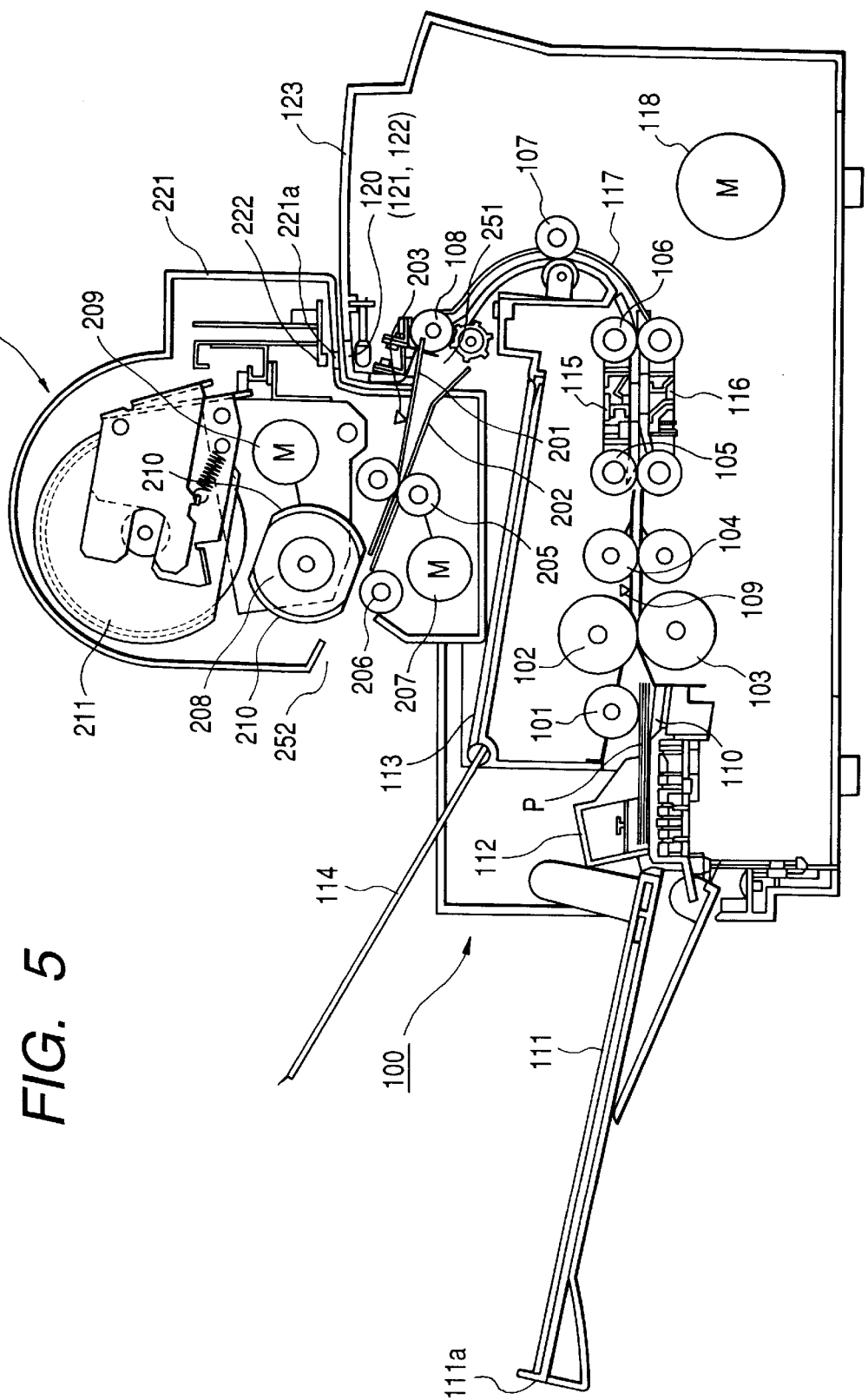
FIG. 5 is a sectional side view of the image recording apparatus to which the stamping apparatus was mounted.

FIG. 2 is a perspective view of a stamping (stamp) apparatus, and FIGS. 3 and 5 are perspective view and sectional side view showing the image recording apparatus 100 to which the stamping apparatus 200 was mounted, respectively.

(a) Mounting of Apparatus

In the illustrated embodiment, as shown in FIG. 3, the stamping apparatus 200 is mounted to the image recording apparatus 100 in such a manner that the stamping apparatus is located above the discharge portion 113 (on the upper surface) of the image recording apparatus, and is straddling between upper edges of left and right side plates 124 (of the image recording apparatus) with facing a front side having a discharge opening 252 (of the stamping apparatus) forwardly and a rear portion (of the stamping apparatus) abuts against a step (shoulder) between the left and right side plates 124 (of the image recording apparatus 100) and the upper cover 123 (see FIG. 5).

More specifically, in the illustrated embodiment, each of lower edge portions of left and right side plates 250 of the stamping apparatus 200 is provided (along its longitudinal direction) with an engagement recess 250a having two orthogonal surfaces corresponding to two orthogonal surfaces (upper and inner surfaces) of the corresponding (left or right) side plate 124 of the image recording apparatus 100. By engaging the engagement recesses 250a with the upper edges of the left and right side plates 124 of the image recording apparatus 100 and by straddling the stamping apparatus 200 between the upper edges of the left and right side plates 124 of the image recording apparatus 100 above the discharge portion 113 and by abutting the rear portion of the stamping apparatus against the shoulder between the left and right side plates 124 of the image recording apparatus and the upper cover 123, the stamping apparatus is stably mounted to the image recording apparatus 100.

The mounting operation of the stamping apparatus 200 with respect to the image recording apparatus 100 as mentioned above does not require special mechanical and electrical connections, and, accordingly, the user can mount and dismount the stamping apparatus with respect to the image recording apparatus in a correct position easily and simply without any expert. Incidentally, in order to maintain the mounting condition of the stamping apparatus 200 with respect to the image recording apparatus 100 more stably, appropriate detent members may be provided to lock the stamping apparatus 200 to the image recording apparatus 100.

In a condition that the stamping apparatus 200 is mounted on the image recording apparatus 100 in place as mentioned above, as shown in FIG. 5, a sheet receiving opening 251 formed in a lower part of the rear portion of the stamping apparatus 200 is positioned behind the discharge roller 108 of the image recording apparatus 100.

In the illustrated embodiment, the sheet receiving opening 251 of the stamping apparatus 200 is a V-shaped opening defined by two convey guide plates 201, 202. The recorded sheet discharged from the discharge roller 108 of the image recording apparatus 100 enters into the stamping apparatus 200 through the sheet receiving opening 251.

Figure 6:
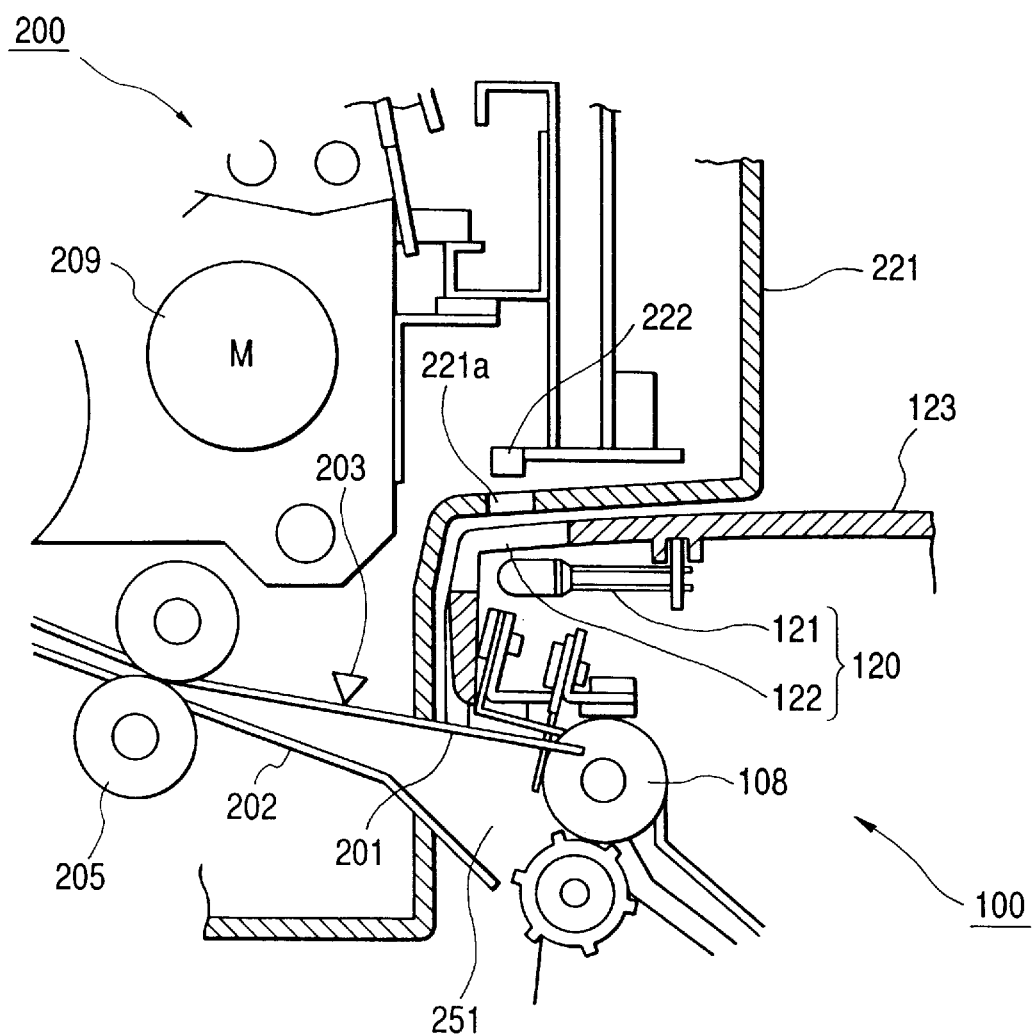
FIG. 6 is an enlarged view showing a part of FIG. 5.

Further, as opening hole 221a (FIGS. 5 and 6) is formed in a lower surface of a rear cover 221 of the stamping apparatus 200 at a central part thereof, and a light receive sensor 222 such as a photo-transistor is disposed in the vicinity of the opening hole 221a.

In the condition that the stamping apparatus 200 is mounted on the image recording apparatus 100 in place, the opening hole 221a is formed in the lower surface of the rear cover 221 of the stamping apparatus 200 at the central part thereof is opposed to the power display portion 120 provided at the upper central portion of the body of the image recording apparatus 100. Accordingly, when the power source switch 119 of the image recording apparatus 100 is turned ON to lighten the power display portion 120, the light enters into the stamping apparatus 200 through the opening hole 221a and is received by the light receive sensor 222 of the stamping apparatus disposed in the vicinity of the opening hole 221a.

(b) Power Source System

The stamping apparatus 200 is connected to a commercial power source via a code (not shown) to receive an electric power, independent from the image recording apparatus 100. The image recording apparatus 100 may include a power supply plug socket as option so that an electric power can be supplied to the stamping apparatus 200 by connecting a plug of the stamping apparatus 200 into the power supply plug socket.

So long as the stamping apparatus 200 is connected to the commercial power source, the electric power is supplied to a predetermined circuit portion of the stamping apparatus 200 including the light receive sensor 222. However, power consumption is very small.

(i) When the power source switch 119 of the image recording apparatus 200 is turned OFF, since the power display portion 120 of the image recording apparatus 100 is not lightened, the light receive sensor of the stamping apparatus 200 does not receive from the power display portion 120. As a result, a predetermined amount of light is not detected by the light receive sensor 222. In this way, the power source (power source circuit) of the image recording apparatus 100 is maintained in the OFF condition and the power source (power source circuit) of the stamping apparatus 200 is also maintained in the OFF condition (drive stop mode).

(ii) When the power source switch 119 of the image recording apparatus 200 is turned ON, the power display portion 120 of the image recording apparatus 100 is lightened, and the light enters into the stamping apparatus 200 through the opening hole 221a and is received by the light receive sensor 222 of the stamping apparatus disposed in the vicinity of the opening hole 221a. As a result, the power source of the stamping apparatus 200 is automatically changed from the OFF condition (drive stop mode) to the ON condition (drive wait mode), and a power display lamp (LED) 231 of an operation portion 230 of the stamping apparatus 200 is lightened.

In the apparatuses 100, 200 according to the illustrated embodiment since the power display portion 120 of the image recording apparatus 100 is concealed when the stamping apparatus 200 is mounted to the image recording apparatus, the power display lamp 231 provided on the operation portion 230 of the stamping apparatus 200 also acts to relay the ON/OFF conditions of the power source of the image recording apparatus 100.

That is to say, it is said that the power sources of both of the image recording apparatus 100 and the stamping apparatus 200 are both in the OFF conditions so long as the power display lamp 231 of the stamping apparatus 200 is not lightened and that the power sources of both of the image recording apparatus 100 and the stamping apparatus 200 are both in the ON condition when the power display lamp 231 is lightened. The ON condition of the power source of the stamping apparatus 200 is maintained so long as the power source switch 119 of the image recording apparatus 100 is turned ON to lighten the power display portion 120.

(iii) When the power source switch 119 of the image recording apparatus 100 is turned OFF again, the power source of the image recording apparatus 100 is turned OFF to put out the power display portion 120, with the result that the light receive sensor 222 of the stamping apparatus does not receive the light from the power display portion 120. Consequently, the predetermined amount of light is not detected by the light receive sensor 222, with the result that the power source of the stamping apparatus 200 is turned OFF again. Thus, the power display lamp 231 of the stamping apparatus 200 is put out.

In this way, as mentioned above, since the power source (power source circuit) of the stamping apparatus 200 is automatically switched to the ON condition (drive wait mode) or the OFF condition (drive stop mode) in accordance with the ON condition or the OFF condition of the power source of the image recording apparatus 100. Thus, since the power source of the stamping apparatus 200 is not manually turned ON/OFF, operability is improved, the sheet conveyed from the image recording apparatus 100 to the stamping apparatus 200 can be prevented from jamming due to the fact that the stamping apparatus 200 is not operated by forgetting the turning ON of the power source of the stamping apparatus 200. Further, after the operation, so long as the power source of the image recording apparatus 100 is turned OFF, useless consumption of the electric power caused by forgetting the turning OFF of the power source of the stamping apparatus 200.

(c) Stamping Operation

In the condition that the stamping apparatus 200 is mounted to the image recording apparatus 100 in place and the power source switch 119 of the image recording apparatus 100 is turned ON (and, accordingly, the power source of the stamping apparatus 200 is automatically turned ON as mentioned above), as mentioned above, the sheets (originals) P such as bills, checks or the like are stacked on the sheet supply portion 110, 111 of the image recording apparatus 100. Then, when the record start key is depressed, the stacked sheets are successively separated one by one to be supplied to the image recording apparatus 100. In the image recording apparatus 100, the image reading and record processing for each sheet is effected, and, the recorded sheet enters from the discharge roller 108 into the sheet receiving opening 251 of the stamping apparatus 200.

When the recorded sheet enters into the sheet receiving opening 251 of the stamping apparatus 200, a tip end of the recorded sheet is detected by a sheet detect sensor 203 disposed in the vicinity of the V-shaped opening (constituting the sheet receiving opening 251) defined by the upper and lower guide plates 201, 202, and a tip end detect signal is inputted to the control means (CPU) 232 (FIG. 9) of the stamping apparatus 200.

The control means 232 drives a first pulse motor 207 on the basis of the tip end detect signal to rotate the convey roller 205 and the platen roller 206 in the normal direction (sheet conveying direction). The driving speeds of the convey roller 205 and the platen roller 206 in this case are synchronous with a discharging speed of the recorded sheet discharged by the discharge roller 108 of the image recording apparatus 100. The recorded sheet entered into the stamping apparatus 200 from the image recording apparatus 100 is relayed by the convey roller 205 (which is now rotated) to be conveyed through the stamping apparatus 200 to reach the platen roller 206 which is now rotated.

On the other hand, the control means 232 drives a second pulse motor 209 at a predetermined control timing on the basis of the tip end detect signal to rotate a stamp drum 208 (disposed above the platen roller 206 in an opposed relation thereto) in the normal direction (sheet conveying direction). A rotation driving speed of the stamp drum 208 is synchronous with a conveying speed of the sheet P conveyed by the convey roller 205 and the platen roller 206.

Stamp members 210 are provided on an outer peripheral surface of the stamp drum 208. When the stamp drum 208 is rotated, the surface of the stamp member 210 is contacted with an ink roller 211 (on which ink is impregnated) disposed above the stamp drum 208, thereby coating the ink on the surface of the stamp member 210. While the recorded sheet is being passed between the surface of the stamp member 210 of the rotating stamp drum 208 and the rotating platen roller 206, seal (stamp) indicating "recorded" is stamped on the sheet. Thereafter, the sheet is discharged out of the stamping apparatus 200 through a discharge opening of the stamping apparatus and is rested on the discharge portion 113 (and discharge tray 114) of the image recording apparatus 100.

Figure 7:
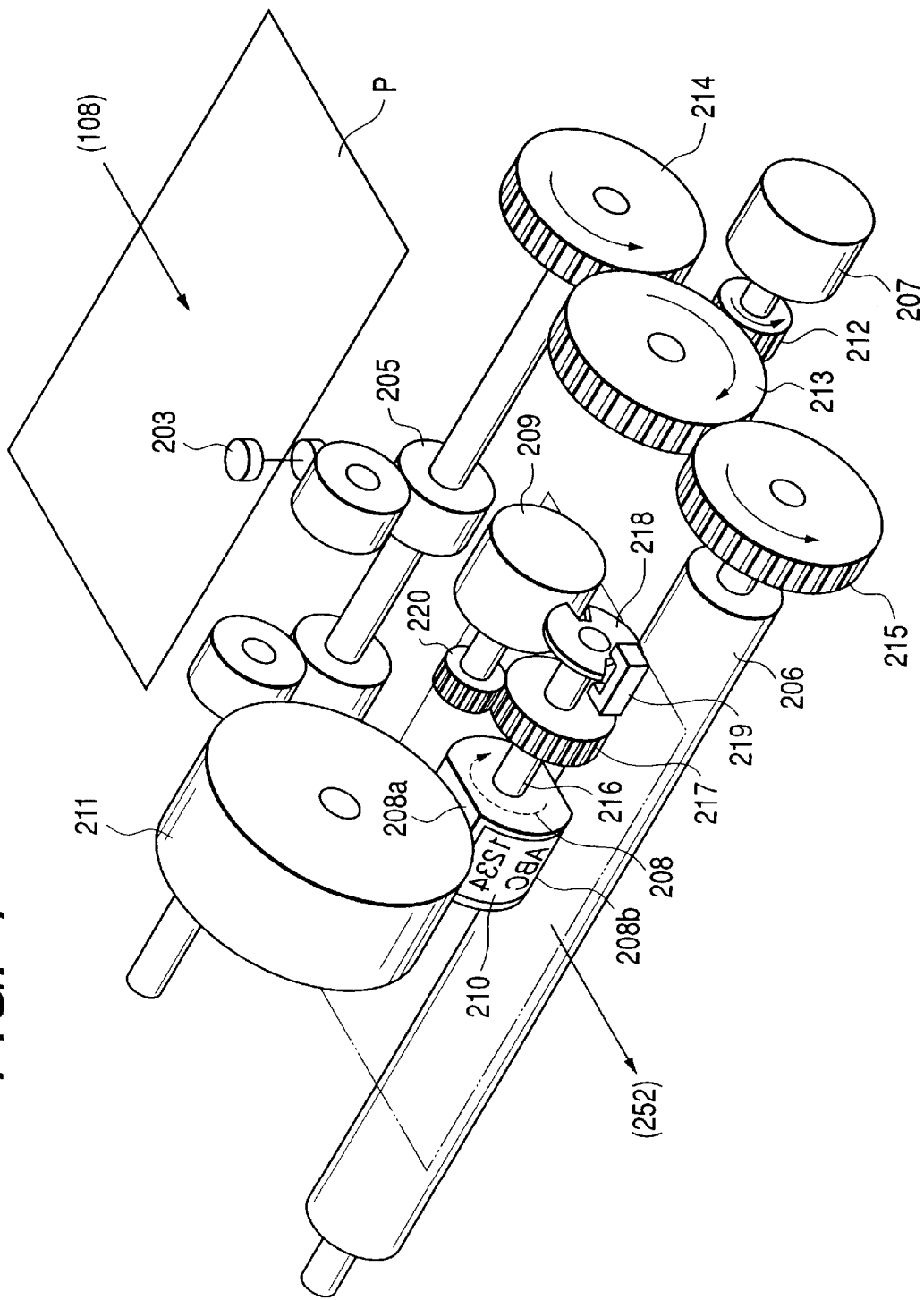
FIG. 7 is a schematic perspective view showing an internal mechanisms of the stamping apparatus.
Figure 8A:
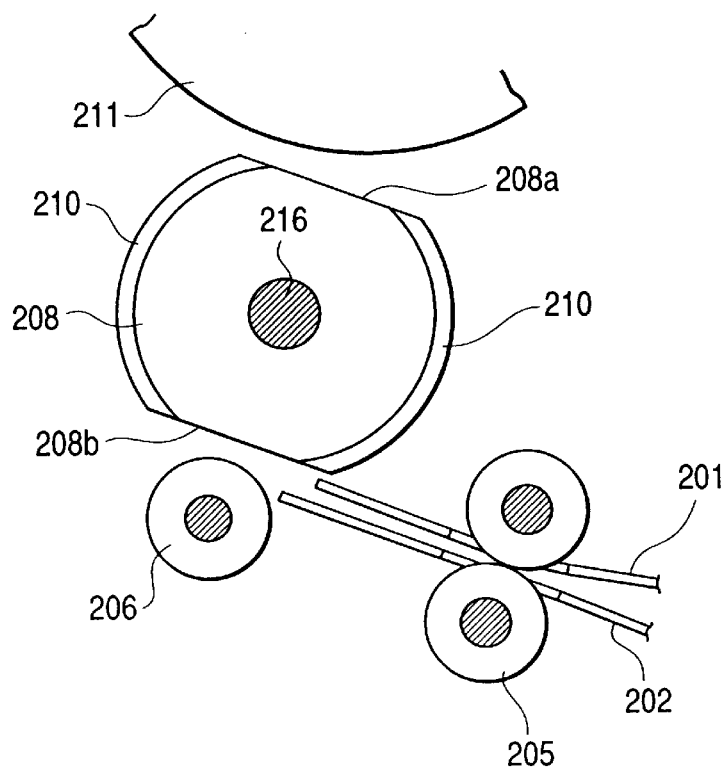
FIGS. 8A and 8B are explanatory views for explaining an operation of a stamp drum.
Figure 8B:
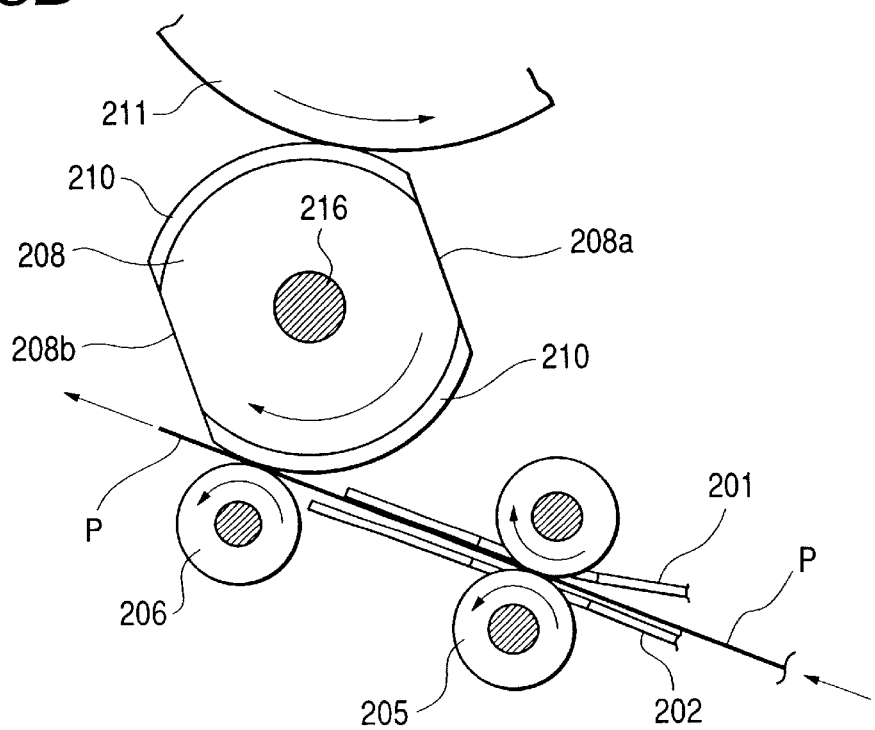

FIG. 7 is a schematic perspective view showing internal mechanisms of the stamping apparatus 200, and FIGS. 8A and 8B are explanatory views for explaining an operation of the stamp drum 208.

A drive gear 212 is connected to the first pulse motor 207, and a rotation driving force of the gear 212 is transmitted to gears 214, 215 via an idler gear 213, so that the convey roller 205 and the platen roller 206 are rotated at a speed synchronous with a discharging speed of the sheet P discharged by the discharge roller 108 of the image recording apparatus 100.

On the other hand, a gear 217 and an encoder 218 are secured to a shaft 216 of the stamp drum 208. A drive gear 220 is connected to the second pulse motor 209, and a rotation driving force of the drive gear 220 is transmitted to the shaft 216 of the stamp drum via the gear 217, so that the stamp drum 208 is rotated at a speed synchronous with the conveying speed of the sheet P conveyed by the convey roller 205 and the platen roller 206.

The stamp drum 208 is provided at its peripheral surface with two stamp members 210 diametrically opposed to each other and two cut-out portions 208a, 208b disposed between the stamp members. A condition that the cut-out portion 208a or 208b is stopped in an opposed relation to the platen roller 206 (FIG. 8A) is waiting condition (home position) of the stamp drum 208. In this condition, a gap is created between the stamp drum and the platen roller, so that the sheet P is passed through the gap not to be stamped.

When the stamp drum 208 is rotated by half revolution, the recorded sheet is pinched between the surface of the stamp member 210 of the stamp drum 208 and the rotating platen roller 206 so that a single seal is stamped on the single sheet P (FIG. 8B).

The waiting condition (home position) of the stamp drum 208 is detected by the encoder 218 set in accordance with the waiting position and a photo-interrupter 219. A stamp position (in the sheet conveying direction) where the seal is stamped on the sheet can be changed by adjusting a timing from when the tip end of the sheet P is detected by the sheet detect sensor 203 to when the rotation of the stamp drum 208 is started.

Figure 9:
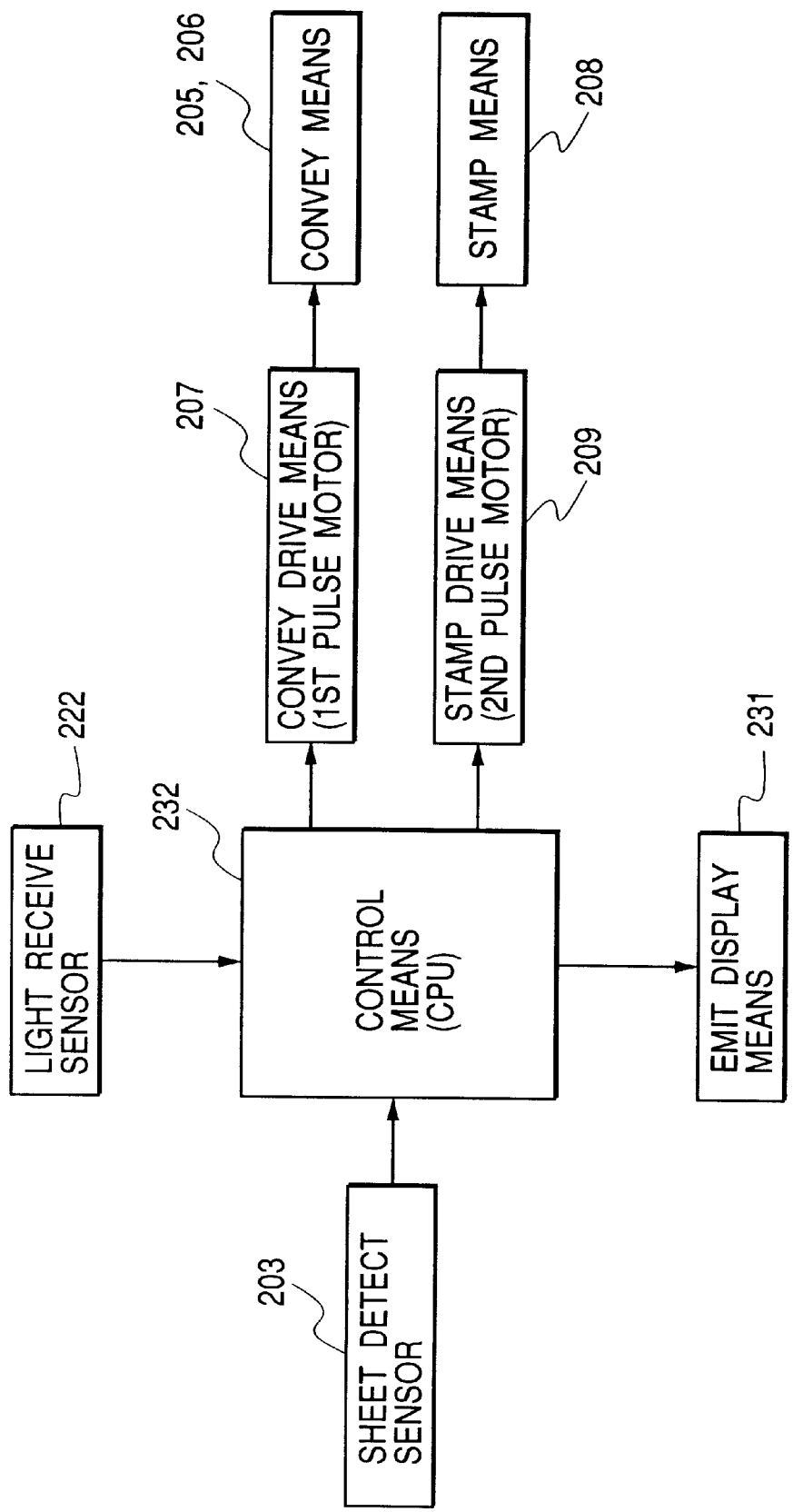
FIG. 9 is a control block diagram of the stamping apparatus.

FIG. 9 is a block diagram of a control system of the stamping apparatus 200. The control means (CPU) 232 of the stamping apparatus 200 detects the ON condition of the power source of the image recording apparatus 100 by receiving the light amount detect signal from the light receive sensor 222, switches the power source of the stamping apparatus 200 from the OFF condition (drive stop mode) to the ON condition (drive wait mode) and lightens the emit display means (power display lamp (LED)) 231. Further, the control means 232 controls the driving of the convey drive means (first pulse motor) 207 and the stamp drive means (second pulse motor) 209 by receiving the sheet tip end detect signal from the sheet detect means (sheet detect sensor) 203 and controls the sheet convey means (convey roller and platen roller) 205, 206 and the stamp means (stamp drum) 208.

In the illustrated embodiment, while an example that the stamp drum 208 and the pulse motor 209 are used as the stamp means and the stamp drive means was explained, the present invention is not limited to such as example, a print mechanism including an ink jet head may be used. The image recording apparatus may be a microfilmer for phototaking the image of the original on a film or a facsimile device for reading and transmitting the image of the original.

As mentioned above, according to the present invention, there is provided a printing apparatus as an option equipment which can detachably be mounted to the main machine such as an image recording apparatus and in which special mechanical and electrical connections (between the stamping apparatus and the main machine such as an image recording apparatus) are not required. Accordingly, any user can detachably mount the printing apparatus to the main machine in a correct position without any expert. Further, a printing apparatus in which operability is improved and occurrence of sheet jam of the conveyed sheet can be prevented can be provided.

Figure 10:
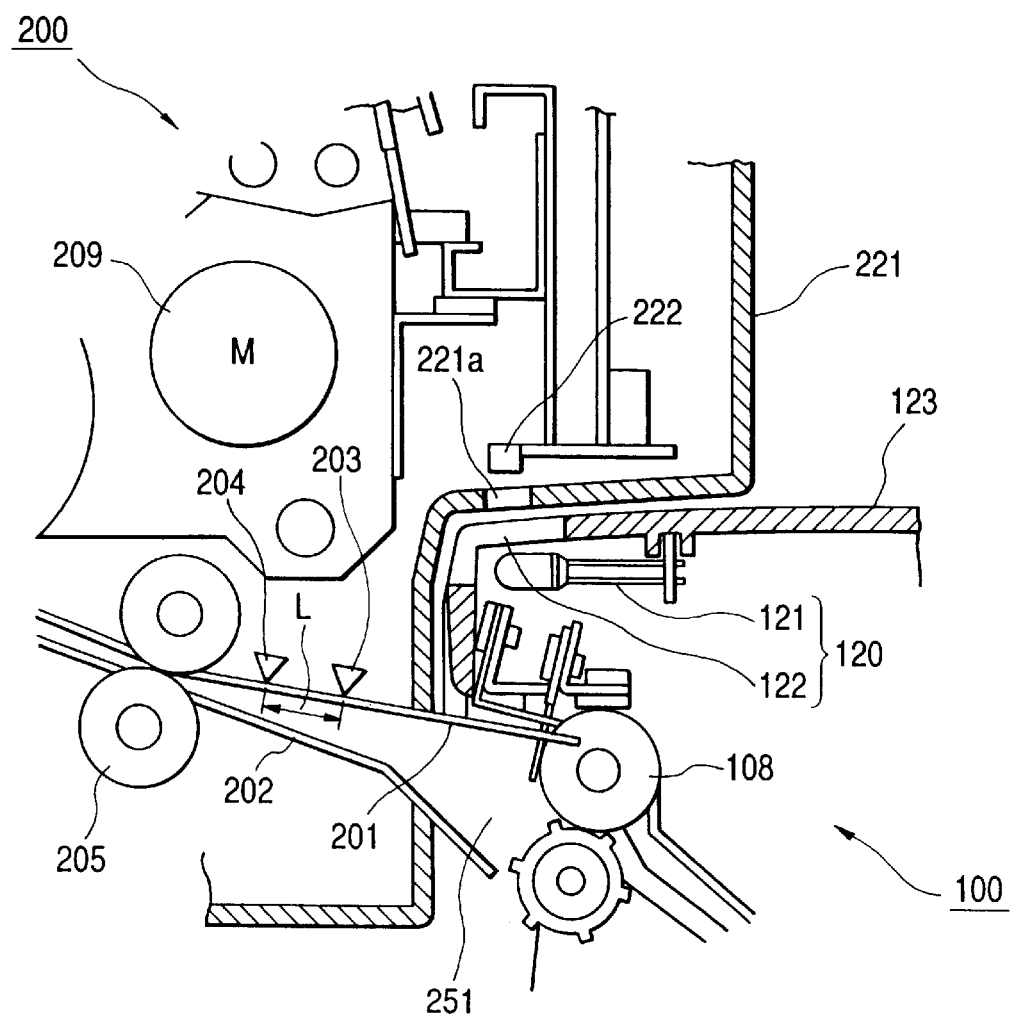
FIG. 10 is partial enlarged view of a stamping apparatus according to another embodiment of the present invention.
Figure 11:
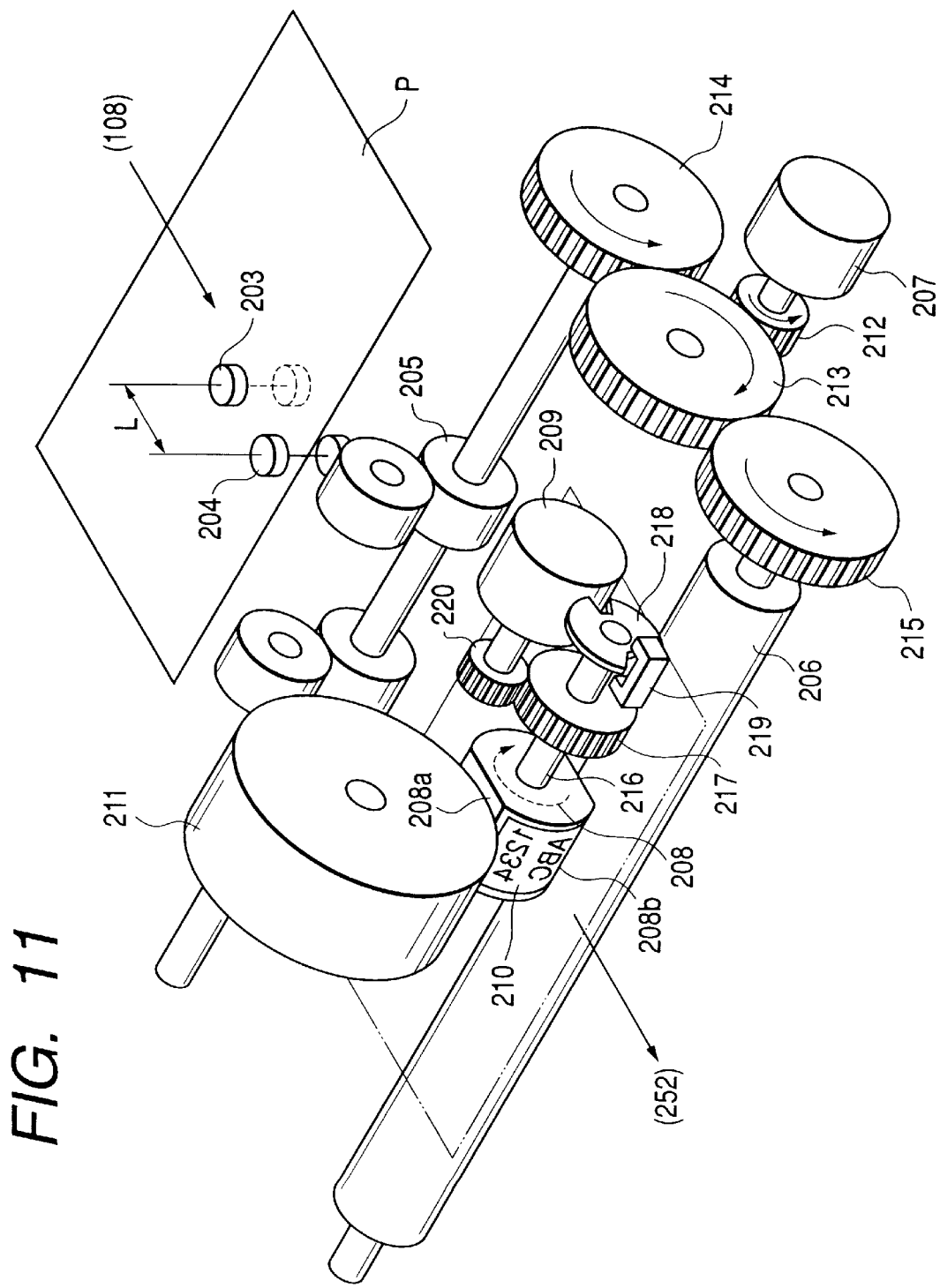
FIG. 11 is a schematic perspective view showing an internal mechanisms of the stamping apparatus.
Figure 12:
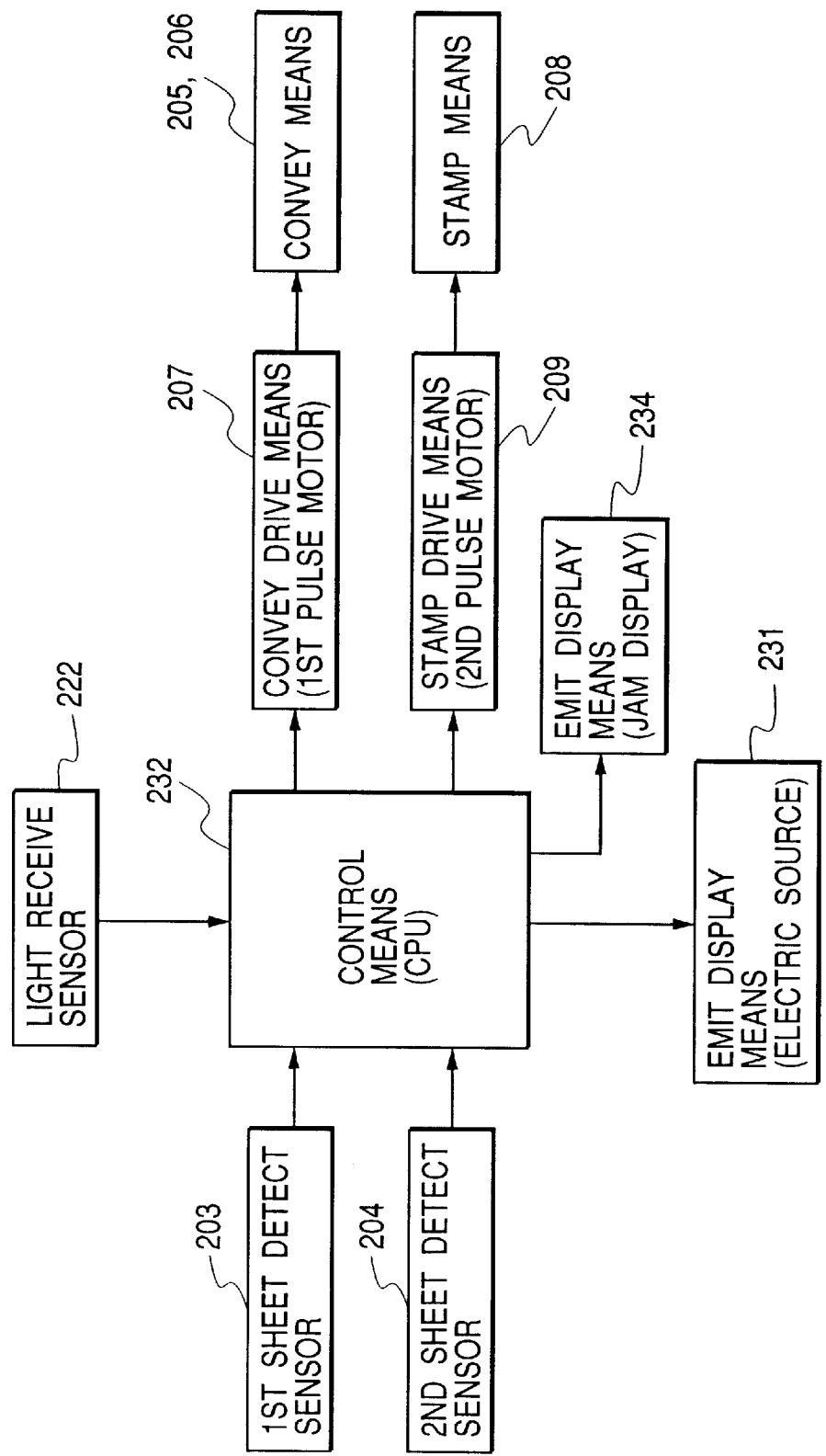
FIG. 12 is a control block diagram of the stamping apparatus.

FIGS. 10, 11 and 12 shows another embodiment of the present invention, and elements same as those in the aforementioned embodiment are designated by the same reference numerals.

Incidentally, in an image recording apparatus 100, although a reading resolving power of an image on the sheet can be changed on demand, regarding a sub-scan direction (sheet conveying direction) of the read image, since an electrical processing amount at an image reading and processing portion is limited, it is required that a conveying speed of the sheet P is changed. The conveying speed of the sheet P can be changed by changing a rotational speed of a motor 118 by means of a control means (not shown).

In FIG. 10, a first sheet detect sensor 203 is disposed in the vicinity of a V-shaped opening (constituting a sheet receiving opening 251 of a stamping apparatus 200) defined by upper and lower guide plates 201, 202, and a second sheet detect sensor 204 is disposed at a downstream side of the first sheet detect sensor in the sheet conveying direction and is spaced apart from the first sensor by a distance L. A tip end of the recorded sheet P entered from the image recording apparatus 100 into the sheet receiving opening 251 of the stamping apparatus 200 is successively detected by the first and second sheet detect sensors 203, 204, and sheet tip end defect signals from the sensors are inputted to a control means (CPU) 232 (FIG. 12) of the stamping apparatus 200.

The control means 232 measures a time period from when it receives the sheet tip end detect signal from the first sheet detect sensor 203 to when it receives the sheet tip end detect signal from the second sheet detect sensor 204, calculates and detects the conveying speed of the recorded sheet P conveyed from the image recording apparatus 100 to the stamping apparatus 200 on the basis of the measured time period and the distance L between the first and second sheet detect sensors 203 and 204 and controls driving of a first pulse motor 207 so that a convey roller 205 and a platen roller 206 are rotated at the calculated (or detected) sheet conveying speed in a normal direction (sheet conveying direction).

As a result, the recorded sheet entered from the image recording apparatus 100 into the stamping apparatus 200 is relayed by the convey roller 205 rotated at the sheet conveying speed to be smoothly conveyed within the stamping apparatus 200 and then passes on the platen roller 206 rotated at the sheet conveying speed.

In the above-mentioned arrangement, by reducing the distance L between the first sheet detect sensor 203 and the second sheet detect sensor 204 as short as possible, a response time required for changing the speed of the convey roller 205 can be decreased, thereby conveying the sheet at a stable speed. That is to say, in order to make the apparatus compact, at the time when the tip end of the recorded sheet entered from the image recording apparatus 100 into the stamping apparatus 200 is detected by the first sheet detector sensor 203, the first pulse motor 207 is driven to rotate the convey roller 205 and the platen roller 206 at the predetermined speed. Thereafter, the tip end of the sheet is detected by the second sheet detect sensor 204, and, at the time when the conveying speed of the recorded sheet P conveyed from the image recording apparatus 100 to the stamping apparatus 200 is calculated and detected, the control means 232 controls to change the driving speed of the convey roller 205 and the platen roller 206 to a speed corresponding to the detected calculated speed. Incidentally, it is desirable that the above-mentioned predetermined speed is the sheet conveying speed. The reason is that, when a plurality of sheets are continuously conveyed by the image recording apparatus 100 at the same speed, it is not required for changing the driving speed of the convey roller 205 and the platen roller 206.

On the other hand, the control means 232 drives a second pulse motor 209 at a predetermined control timing on the basis of the tip end detect signal from the second sheet detect sensor 204 to rotate a stamp drum 208 (disposed above the platen roller 206 in an opposed relation thereto) in the normal direction (sheet conveying direction). A driving speed of the stamp drum 208 is synchronous with a conveying speed of the sheet P conveyed by the convey roller 205 and the platen roller 206.

Stamp members 210 are provided on an outer peripheral surface of the stamp drum 208. When the stamp drum 208 is rotated, the surface of the stamp member 210 is contacted with an ink roller 211 (on which ink is impregnated) disposed above the stamp drum 208, thereby coating the ink on the surface of the stamp member 210. While the recorded sheet is being passed between the surface of the stamp member 210 of the rotating stamp drum 208 and the rotating platen roller 206, seal (stamp) indicating "recorded" is stamped on the sheet.

Thereafter, the sheet is discharged out of the stamping apparatus 200 through a discharge opening 252 of the stamping apparatus 200 and is rested on a discharge portion 113 (and discharge tray 114) of the image recording apparatus 100.

FIG. 11 is a schematic perspective view showing internal mechanisms of the stamping apparatus 200.

A drive gear 212 is connected to the first pulse motor 207, and a rotation driving force of the gear 212 is transmitted to gears 214, 215 via an idler gear 213, so that the convey roller 205 and the platen roller 206 are rotated at a speed synchronous with a discharging speed of the sheet P discharged by a discharge roller 108 of the image recording apparatus 100.

On the other hand, a gear 217 and an encoder 218 are secured to a shaft 216 of the stamp drum 208. A drive gear 220 is connected to the second pulse motor 209, and a rotation driving force of the drive gear 220 is transmitted to the shaft 216 of the stamp drum via the gear 217, so that the stamp drum 208 is rotated at a speed synchronous with the conveying speed of the sheet P conveyed by the convey roller 205 and the platen roller 206.

The stamp drum 208 is provided at its peripheral surface with two stamp members 210 diametrically opposed to each other and two cut-out portions 208a, 208b disposed between the stamp members. A condition that the cut-out portion 208a or 208b is stopped in an opposed relation to the platen roller 206 (refer to FIG. 8A) is a waiting condition (home position) of the stamp drum 208. In this condition, the sheet P is passed through a gap between the stamp drum and the platen roller not to be stamped. The waiting condition (home position) of the stamp drum 208 is detected by the encoder 218 set in accordance with the waiting position and a photo-interrupter 219.

When the stamp drum 208 is rotated by half revolution, the recorded sheet is pinched between the surface of the stamp member 210 of the stamp drum 208 and the rotating platen roller 206 so that a single seal is stamped on the single sheet P (refer to FIG. 8B).

A stamp position (n the sheet conveying direction) where the seal is stamped on the sheet P can be changed by adjusting a timing from when the tip end of the sheet P is detected by the second sheet detect sensor 204 to when the rotation of the stamp drum 208 is started.

In this case, if the speed of the recorded sheet P conveyed from the discharge roller 108 of the image recording apparatus 100 to the stamping apparatus 200 is differentiated from the sheet conveying speed of the sheet convey means 205, 206 of the stamping apparatus 100, the stamp position is deviated or changed. In this regard, in order to keep the stamp position constant, it is required that the drive start timing of the stamp drum 208 is controlled in accordance with the above-mentioned calculated sheet conveying speed. However, in the illustrated embodiment, since such a timing is controlled by the number of pulses of the pulse motor 207, the stamp position is kept constant regardless of the speed.

Further, even if the sheet is jammed at the junction between the image recording apparatus 100 and the stamping apparatus 200 in dependence upon a condition of the sheet tip end detect signals from the first and second sheet detect sensors 203, 204 in the stamping apparatus 200, such sheet jam can be detected by the control means 232.

That is to say, in the image recording apparatus 100, since a maximum size (length) of available sheet and a minimum conveying speed are previously set, if output signals each having a time period greater than a time period required for conveying the maximum length sheet at the minimum conveying speed of the image recording apparatus 100 continue to be outputted from the first sheet detect sensor 203 or the second sheet detect sensor 204, it is considered that the sheet is trapped for any reason. Alternately, after the output signal is outputted from the first sheet detect sensor 203, if the output signal is not outputted from the second sheet detect sensor 204 within a time period required for conveying the sheet by the distance L at the minimum conveying speed of the image recording apparatus 100, it is considered that the conveyance of the sheet is blocked between the sensors 203 and 204.

In such cases, the control means 232 judges that the conveyed sheet is jammed, and stops the driving of the convey roller 205, platen roller 206 and stamp drum 208 in the stamping apparatus 200. Further, an LED 234 of an operation portion 230 of the stamping apparatus 200 is lightened to display the sheet jam.

Incidentally, the sheet jammed at the junction between the image recording apparatus 100 and the stamping apparatus 200 can easily be removed by dismounting the stamping apparatus 200 from the image recording apparatus 100. After the jam treatment, by depressing a reset button (not shown), the control system is restored to an initial condition.

FIG. 12 is a block diagram of a control system of the stamping apparatus 200. The control means (CPU) 232 of the stamping apparatus 200 detects the ON condition of the power source of the image recording apparatus 100 by receiving the light amount detect signal from the light receive sensor 222, switches the power source of the stamping apparatus 200 from the OFF condition (drive stop mode) to the ON condition (drive wait mode) and lightens the emit display means (power display lamp (LED)) 231.

Further, since the sheet tip end detect signal from the first sheet detect means 203 and then the sheet tip end detect signal from the second sheet detect means 204 are inputted to the control means 232, the control means 232 compares and checks a time difference between the signals thereby to calculate the conveying speed of the recorded sheet conveyed from the image recording apparatus 100 to the stamping apparatus 200. And, the control means controls the driving of the convey drive means (first pulse motor) 207 and the stamp drive means (second pulse motor) 209 on the basis of the calculated sheet conveying speed and sets and controls the driving speed of the sheet convey means (convey roller and plate roller) 205, 206 and the driving timing and driving speed of the stamp means (stamp drum) 208 and the stamp drive means 209.

Further, if abnormal detect signals from the first sheet detect means 203 and the second sheet detect means 204 are inputted to the control means 232, the control means judges that the sheet jam occurs and lightens the emit display means (jam display lamp (LED)) 234.

As mentioned above, according to the present invention, there is provided a stamping apparatus as an option equipment which can detachably be mounted to the main machine such as an image recording apparatus and in which special mechanical and electrical connections (between the stamping apparatus and the main machine such as an image recording apparatus) are not required. Accordingly, any user can detachably mount the stamping apparatus to the main machine in a correct position without any expert and in which the sheet conveying speed and the drive start timing of the stamp means can be changed in accordance with the sheet conveying speed of the main machine such as an image recording apparatus.

Further, a stamping apparatus which can be made compact and in which if the sheet conveyed from the main machine such as an image recording apparatus is jammed such sheet cam can be detected easily and simply to display the sheet jam can be provided. Furthermore, a stamping apparatus in which operability is improved and occurrence of sheet jam of the conveyed sheet caused by forgetting the turning ON of the power source can be prevented can be provided.

Next, a further embodiment of the present invention will be explained.

Figure 13:
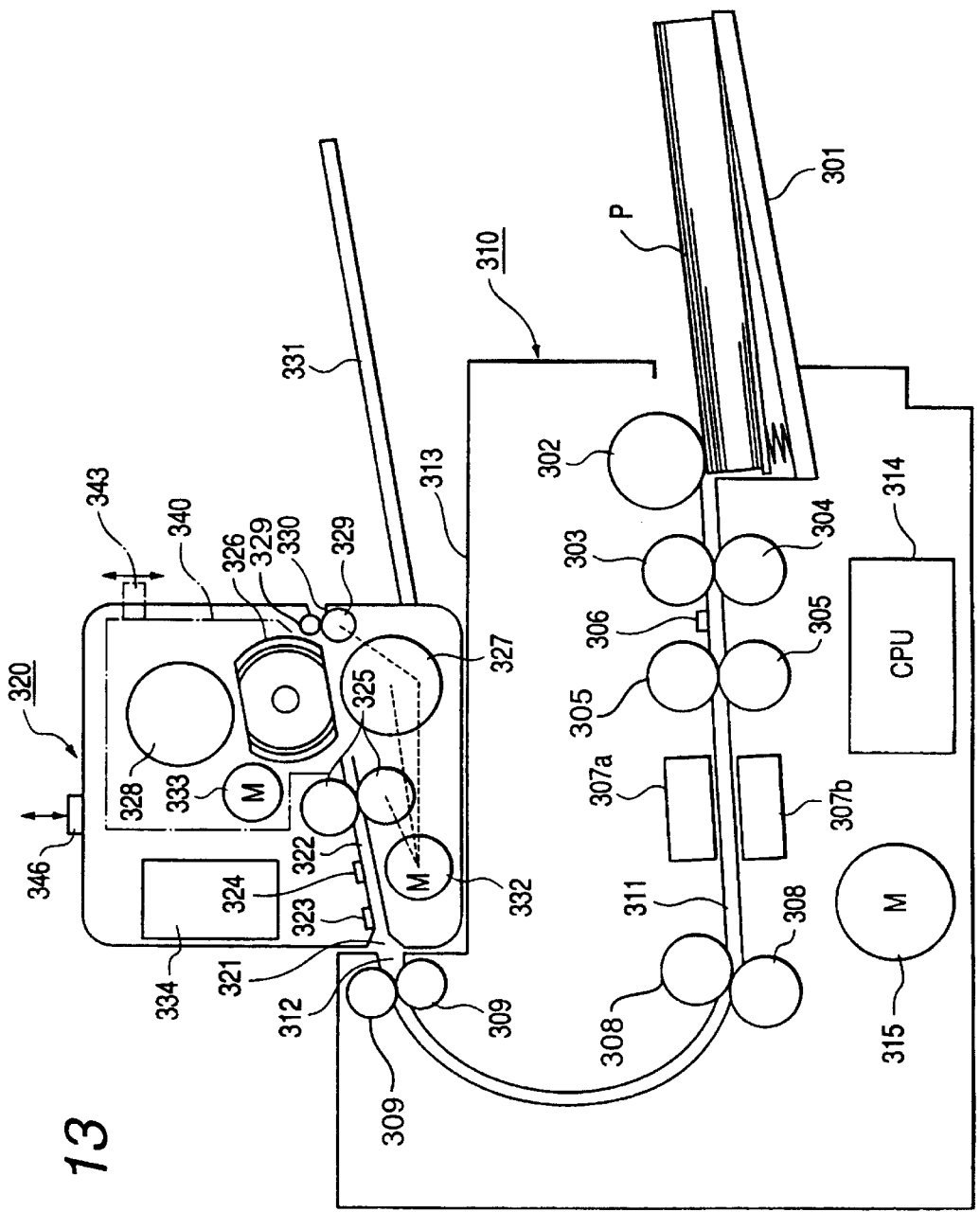
FIG. 13 is a schematic view of an apparatus according to a further embodiment of the present invention.

In FIG. 13, an image recording apparatus 310 serves to read image information on a sheet (original) and record such information on a recording disc or a microfilm. A stamping apparatus 320 is an option equipment which can detachably be mounted to the image recording apparatus 310 by the user on demand and is used by mounting the stamping apparatus on a discharge tray 313 of an upper surface of the image recording apparatus 310 in place.

In a condition that the stamping apparatus 320 is mounted to the image recording apparatus 310 in place, a sheet supply opening 321 of the stamping apparatus 320 is connected to a sheet discharge opening 312 of the image recording apparatus 310 to communicate both apparatuses 310, 320 with each other.

(1) Image Recording Apparatus 310

The image recording apparatus 310 is connected to a commercial power source, and, when a power source switch provided on a control panel (not shown) of the apparatus is powered on, an electric power is supplied to the image recording apparatus.

Sheet-shaped originals to be recorded and reserved (referred to as "sheets" hereinafter) P such as bills, checks or shares are stacked on a sheet supply tray 301. When a record start key (not shown) is depressed, a sheet supply roller 302 is driven to apply a load onto an uppermost sheet P in the sheet stack to draw the sheet into the apparatus 310, with the result that the uppermost sheet is separated from the other sheets by means of a pair of separation/supply rollers (sheet draw-in roller 303 and separation roller 304).

A pair of regist rollers 305 serve to receive and stop a tip end of the separated sheet temporarily and to supply the sheet at a predetermined timing. A sheet detect sensor 306 for detecting the tip end of the supplied sheet is disposed between the pair of separation/supply rollers 303, 304 and the pair of regist rollers 305. When a sheet tip end detect signal from the sheet detect sensor 306 is inputted to a control circuit 314, a counter in the control circuit is operated, thereby setting a drive start timing of the regist roller pair 305 and record start timings of first and second recording portions 307a, 307b.

When the regist roller pair 305 is operated at the predetermined timing, the sheet having the tip end stopped by the nip of the regist roller pair 305 is conveyed at a predetermined speed. While the sheet is being conveyed between the first and second recording portions 307a and 307b, image information on both surfaces of the sheet is record-treated by the first and second recording portions 307a and 307b. The recording portions 307a, 307b comprise photo-electrical conversion reading systems (image sensors) or reduction projection optical systems and serve to record the image information on the conveyed sheet P on an electrical recording medium such as an optical disc or a magnetic disc, or a microfilm.

The recorded sheet passed through the recording portions 307a, 307b passes through a pair of convey rollers 308 and a pair of discharge rollers 309 and is discharged out of the image recording apparatus 310 through the discharge opening 312. When the stamping apparatus 320 is not mounted to the image recording apparatus 310, the recorded sheet is discharged onto the discharge tray 313 of the upper surface of the image recording apparatus 310. When the stamping apparatus 320 is mounted to the image recording apparatus as shown in FIG. 13, the recorded sheet is introduced from the discharge opening 312 of the image recording apparatus 310 into the sheet supply opening 321 of the stamping apparats 320. While the sheet is being conveyed through the stamping apparatus 200, the recorded sheet is subjected to the stamp treatment and then is discharged onto a discharge tray 331 of the stamping apparatus 320.

A sheet path 311 extends from the sheet supply roller 302 to the discharge opening 312. A driving force of a drive motor 315 of the image recording apparatus 310 is transmitted to the sheet supply roller 302, pair of separation/supply rollers 303, 304, pair of regist rollers 305, pair of convey rollers 308 and pair of discharge rollers 309 through a power transmitting systems (not shown) such as gear trains and belts.

ON/OFF control and speed control of the drive motor 315 are effected by the control circuit 314. The sheet conveying speed within the image recording apparatus 310 can be set to one of plural speed values such as a high speed value, a low speed value and the like in accordance with conditions such as a sheet size, a reading speed, magnification, a resolving power and the like. The change in the conveying speed can be effected by changing the drive speed of the drive motor 315 by manipulating a setting means (not shown) provided on the control panel. Accordingly, the speed of the recorded sheet introduced from the image recording apparatus 310 into the stamping apparatus 320 corresponds to the speed set in the image recording apparatus 310 (which may be high speed or low speed).

(2) Stamping Apparatus 320

Figure 14:
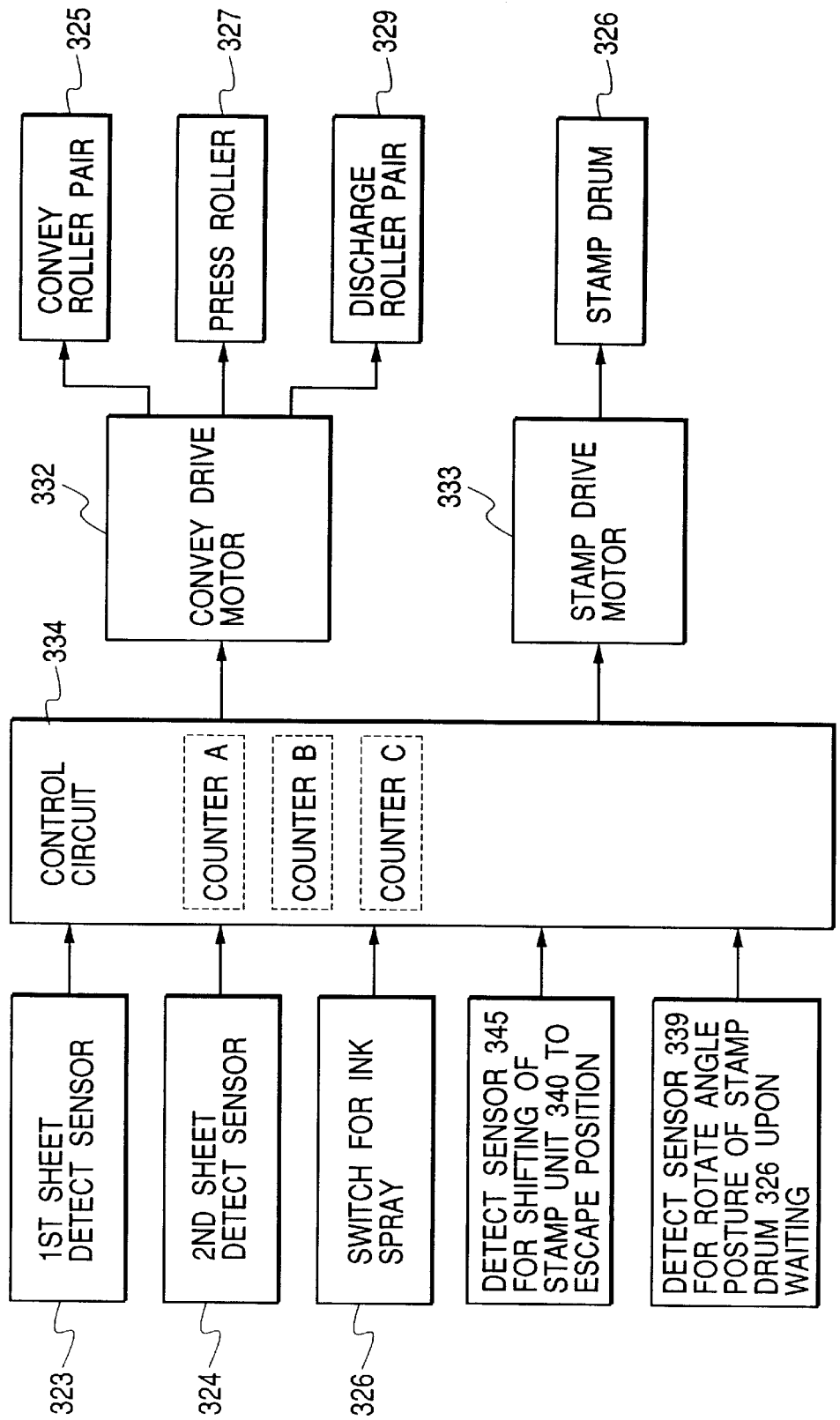
FIG. 14 is a control block diagram.

The stamping apparatus will be mainly explained with reference to FIG. 13 and a control block diagram of FIG. 14.

In the illustrated embodiment, the stamping apparatus 320 is provided with a drive source independently from the image recording apparatus (main machine) 100 so that a sheet conveying speed, a stamp speed and a sheet discharging speed of the stamping apparatus can be set independently with respect to the sheet conveying speed of the image recording apparatus 100. The stamping apparatus 320 is also connected to a commercial power source, and, when a power source switch provided on a control panel (not shown) of the apparatus is powered on, an electric power is supplied to the stamping apparatus. Alternatively, when the power source of the image recording apparatus 310 is turned ON, the stamping apparatus may be automatically be turned ON.

Along a sheet path 322 extending from the sheet supply opening 321 to the discharge opening 330, there are disposed in order a first sheet detect sensor 323, a second sheet detect sensor 324, a pair of convey rollers 325, a stamp drum (stamp means) 326 and a press roller (counter means) 327 arranged below the stamp drum, and a pair of discharge rollers 329. And, an ink roller (ink supply means) 328 is disposed above the stamp drum 326.

A convey drive motor (first drive motor) 332 serves to drive the pair of convey rollers 325, press roller 327 and pair of discharge rollers 329 through a power transmitting mechanism (not shown) such as a gear train. A stamp drive motor (second drive motor) 333 serves to drive the stamp drum 326.

(i) The tip end of the recorded sheet discharged from the discharge opening 312 of the image recording apparatus 310 and introduced from the supply opening 321 of the stamping apparatus 320 into the sheet path 322 is detected by the first sheet detect sensor 323, and a detect signal from the sensor is inputted to a control circuit 334.

The control circuit 334 turns ON the convey drive motor 332 on the basis of the input signal (detect signal) to start rotations of the pair of convey rollers 325, press roller 327 and pair of discharge rollers 329. At the same time, the control circuit 334 starts counting of a counter A in the control circuit. The counter A serves to detect a speed of the introduced sheet.

Then, the tip end of the introduced sheet is detected by the second sheet detect sensor 324, and a detect signal from the sensor is inputted to the control circuit 334. The control circuit 334 stops the counting of the counter A on the basis of the input signal (detect signal), and detects the conveying speed of the recorded sheet introduced from the image recording apparatus 310 into the stamping apparatus 320 on the basis of the contents of the counter, and changes and controls the driving speed of the convey drive motor 332 so that the pair of convey rollers 325, press roller 327 and pair of discharge rollers 329 are rotated at the detected sheet conveying speed.

As a result, the recorded sheet introduced from the image recording apparatus 310 into the stamping apparatus 320 is conveyed through the pair of convey rollers 325, a stamp portion between the stamp drum 326 and the press roller 327, and the pair of discharge rollers 329 at a speed same as the introducing speed of the sheet from the image recording apparatus 310.

(ii) Further, the control circuit 334 starts counting of a counter B in the control circuit on the basis of the tip end detect signal from the second sheet detect sensor 324. The counter B serves to set a drive start timing of the stamp drum 326. The contents of the counter B is set be greater than at least a count value from when the tip end of the introduced sheet is detected by the second sheet detect sensor to when the tip end reaches the stamp drum 326.

When the counter B is timed up, the control circuit 334 turns ON the stamp drive motor 333 to rotate the stamp drum 326 by half revolution in the same direction and speed as those of the recorded sheet. At the time when the counter B is timed up, the tip end of the recorded sheet has reached at least the stamp drum 326, and the recorded sheet is pinched and conveyed between the stamp member (arcuate surface portion) of the stamp drum 326 and the rotating press roller 327, with the result that a seal (stamp) is stamped on a rear surface (in the illustrated embodiment) of the sheet.

The stamped recorded sheet is further conveyed through the stamping apparatus 320 at the speed same as the introducing speed of the sheet introduced from the image recording apparatus 310, and then is discharged onto a discharge tray 331 through the discharge opening 330.

(iii) While the recorded sheet is being further conveyed through the stamping apparatus, when a trail end of the sheet is detected by the first or second sheet detect sensor 323 or 324, a detect signal is inputted to the control circuit 334. The control circuit 334 starts counting of a counter C in the control circuit on the basis of such a detect signal. In the illustrated embodiment, the counting of the counter C is started on the basis of a sheet trail end detect signal from the second sheet detect sensor 324.

The counter C serves to count the timing for discharging the trail end of the sheet to set the change timing of the sheet discharging speed. The contents of the counter C is set to a count value from when the trail end of the sheet is detected by the second sheet detect sensor 324 to when the trail end of the sheet leaves the pair of discharge rollers 329.

When the counter C is timed up, the control circuit 334 changes and controls the driving speed of the convey drive motor 332 so that the pair of convey rollers 325, the press roller 327 and the pair of discharge rollers 329 are rotated at an optimum discharging speed.

(a) Stamp Unit

Figure 15:
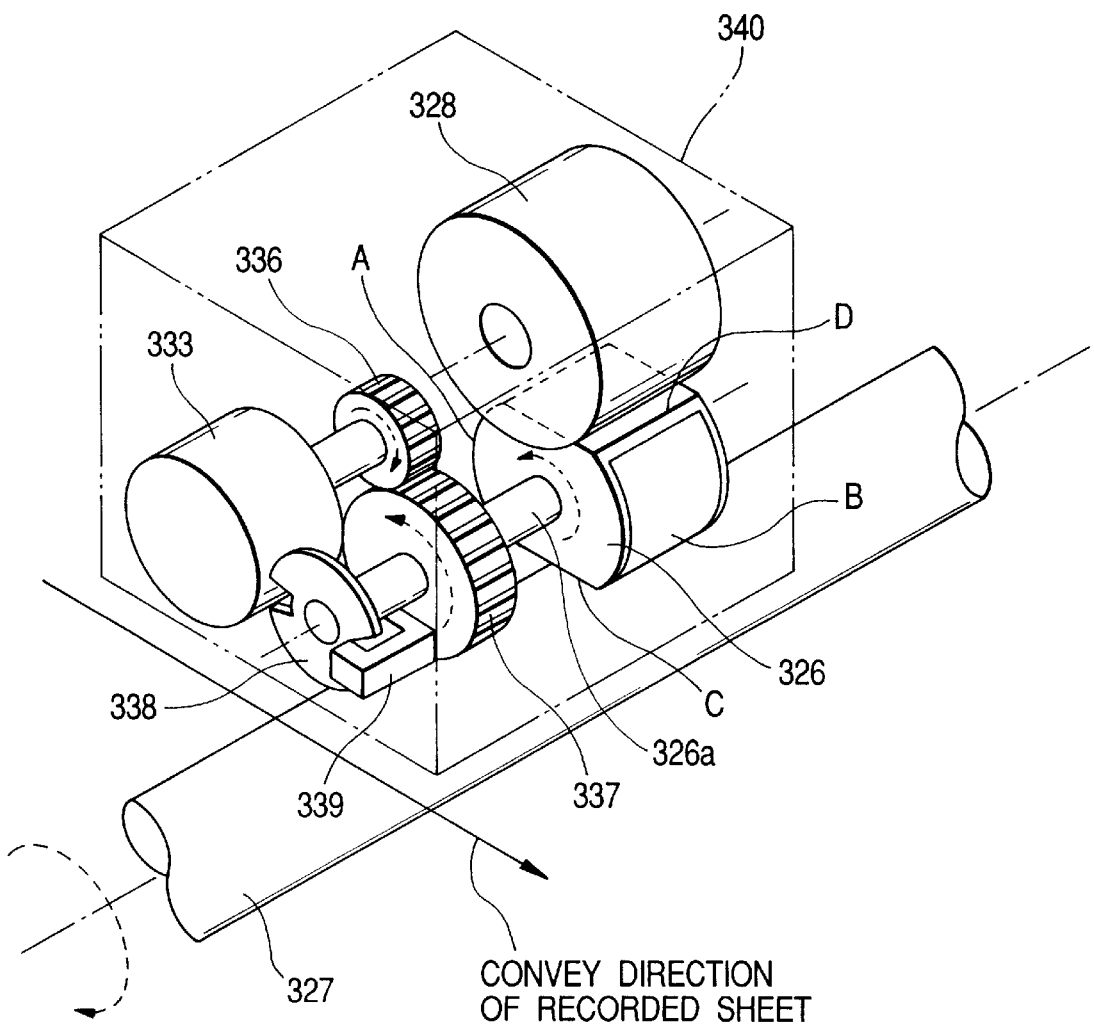
FIG. 15 is a perspective view showing interior of a stamp unit.

FIG. 15 is a schematic perspective view showing internal mechanisms of the stamping apparatus 320. A gear 337 and an encoder 338 are secured to a drive shaft 326a of the stamp drum 326. A drive gear 336 integrally secured to an output shaft of the stamp drive motor 333 is meshed with the gear 337. Accordingly, a rotational driving force of the stamp drive motor 333 is transmitted to the stamp drum 326 through the drive gear 336, gear 337 and drive shaft 326a thereby to rotate the stamp drum 326. The encoder 338 is rotated together with the stamp drum 326. A photo-interrupter 339 is associated with the encoder 338 in pair.

In the illustrated embodiment, a mechanism comprised of the stamp drum 326, drive shaft 326a, gear 337, encoder 338, stamp drive motor 333, drive gear 336, photo-interrupter 339 and ink roller 328 is assembled to a common unit frame as a stamp unit 340, and the stamp unit 340 is arranged above the press roller 327 within the stamping apparatus 320 for vertical movement.

In the illustrated embodiment, as shown in FIGS. 16A to 16F, by providing a pair of vertical elongated guide slots 341 formed in left and right side plates of the unit frame of the stamp unit 340 in an opposed relation to each other and a pair of cross shafts 342 secured to the stamping apparatus and engaged by the guide slots 341, the stamp unit 340 can be shifted vertically within the lengths of the elongated guide slots 341.

In a free condition, the stamp unit 340 is lowered by its own weight so that, as shown in FIG. 16A, upper ends of the vertical guide slots 341 abut against the cross shafts 342 to prevent further lowering of the stamp unit. Normally, the stamp unit 340 is held at this lowered stable position. This lowered stable position of the stamp unit 340 is referred to as "normal position".

Further, a finger grip 343 is integrally formed with the unit frame of the stamp unit 340. When the user lifts the stamp unit 340 in opposition to its own weight by hooking his finger to the finger grip 343, as shown in FIG. 16B, lower ends of the vertical guide slots 341 abut against the cross shafts 342 to prevent further lifting of the stamp unit (upper limit position). This upper limit position of the stamp unit 340 is referred to as "escape position".

A light source and a light receiving element of a photo-interrupter 345 are fixedly provided on the stamping apparatus in an opposed relation to each other on both sides of the cross shafts 342, and a sensor light path of the photo-interrupter extends in parallel with the cross shafts 342. When the stamp unit 340 is located at the escape position, the sensor light path of the photo-interrupter 345 is blocked by a flag 344 on the stamp unit 340, and a sensor light path block signal is inputted to the control circuit 334, thereby detecting the fact that the stamp unit 340 is located at the escape position.

When the user releases his finger from the finger grip 343, the stamp unit 340 is lowered by its own weight to return from the escape position to the normal position. When the stamp unit 340 is located at the normal position, the flag 344 is retarded from the sensor light path of the photo-interrupter 345 to open the sensor light path. In this case, a sensor light path open signal is inputted to the control circuit 334, thereby detecting the fact that the stamp unit 340 is located at the normal position.

(b) Detection and Fixing of Rotation Angle Posture of Stamp Drum 326 Upon Waiting Similar to the stamp drum in the conventional apparatus, the stamp drum 326 is provided at its peripheral surface with two stamp members A, B having same stamp contents and diametrically opposed two each other and two cut-out portions C, D disposed between the stamp members.

When the stamping apparatus is waiting (inoperative), as shown in FIG. 16A, the stamp drum 326 is kept stationary with a rotation angle posture in which the stamp members A, B are directed laterally (in this case, the downwardly facing cut-out portion C is not contacted with the press roller 327 to form a gap $\alpha$ therebetween, and the upwardly facing cut-out portion D is not contacted with the ink roller 328 to form a gap therebetween). This rotation angle posture of the stamp drum 326 is referred to as "rotation angle posture upon waiting".

As shown in FIG. 15, the above-mentioned rotation angle posture of the stamp drum 326 upon waiting is detected by the encoder 338 having two diametrically opposed slits and the photo-interrupter 339 associated with the encoder 338 in pair. That is to say, when one of the slits of the encoder 338 is located in a sensor light path of the photo-interrupter 339 to open the sensor light path, a rotation angle condition of the encoder 338 indicates the rotation angle posture of the stamp drum 326 upon waiting. In this case, a sensor light path open signal is inputted from the photo-interrupter 339 is the control circuit 334, thereby detecting the rotation angle posture of the stamp drum 326 upon waiting.

When the rotation angle posture of the stamp drum 326 upon waiting is detected on the basis of the sensor light path open signal from the photo-interrupter 339, the control circuit 334 rotates the stamp drum 326 by a predetermined given angle and at that time stops the stamp drive motor 333, thereby keeping the stamp drum 326 in the rotation angle posture upon waiting. Further, the control circuit 334 fixes (locks) the rotation of the stamp drum 326 so that the stamp drum 326 stopped at the rotation angle posture upon waiting is prevented from being deviated from its rotation angle posture upon waiting due to natural or free rotation caused by vibration of the apparatus and the like, until the stamp drum starts a next stamp operation.

In the illustrated embodiment, a stepping motor is used as the stamp drive motor 333, and, by controlling application of current to the motor 333 by means of the control circuit 334 in such a manner that stationary torque on a rotation shaft of the motor becomes great in the condition that the stamp drum 326 is stopped at the rotation angle posture upon waiting, the rotation of the stamp drum 326 in the rotation angle posture upon waiting is fixed.

(c) Automatic Restoring Function of Stamp Drum 326 to Rotation Angle Posture Upon Waiting In the waiting condition of the apparatus, when a sensor light path block signal is inputted to the control circuit 334 from the photo-interrupter 339, the control circuit 334 judges that the stamp drum 326 is deviated from the rotation angle posture upon waiting. In this case, the control circuit drives the stamp drive motor 333 and waits a condition that the sensor light path open signal is inputted from the photo-interrupter 339 to the control circuit 334. On the basis of signal input, the control circuit 334 detects the fact that the stamp drum 326 is restored to the rotation angle posture upon waiting and then rotates the stamp drum 326 by the predetermined given angle. Thereafter, the rotation of the stamp drive motor 332 is stopped and the rotation of the stamp drum 326 is fixed.

By automatically restoring the stamp drum 326 to the rotation angle posture upon waiting in this way, if the rotation angle posture of the stamp drum in the waiting condition is deviated upon power ON of the apparatus or due to erroneous operation, the stamp drum can automatically be restored to the predetermined rotation angle posture upon waiting, thereby solving any problem caused by rotational deviation of the stamp drum.

(d) Stamp Operation

In the waiting condition of the apparatus, as shown in FIG. 16A, when the stamp unit 340 is located at the lowered stable position (normal position), the stamp members A, B are directed laterally (in this case, the downwardly facing cut-out portion C is not contacted with the press roller 327 to form the gap α therebetween, and the upwardly facing cut-out portion D is not contacted with the ink roller 328 to form the gap therebetween), thereby stopping and fixing the stamp drum at the rotation angle upon waiting. The gap α permits passage of the recorded sheet P.

In the stamp operation, the stamp drive motor 333 is rotated by the control circuit 334 at a predetermined stamp operation start timing set by the counter B to thereby rotate the stamp drum 326. The rotation of the stamp drum 326 has the same direction and speed as those of conveyance of the recorded sheet. At the time when the rotation of the stamp drum 326 is started, the tip end of the recorded sheet reaches at least the stamp drum 326, with the result that the recorded sheet is pinched and conveyed between the semi-cylindrical stamp member A of the stamp drum 326 and the rotating press roller 327, thereby stamping the seal on the sheet.

The other stamp member B is rotatingly shifted while contacting with the ink roller 328, thereby coating the ink on the stamp member B uniformly. The ink roller 328 is rotatingly driven by the rotation of the stamp drum 326. In the next stamp operation, the stamp member B on which the ink is coated is opposed to the press roller 327, with the result that the seal is stamped on the next sheet P between the stamp member B and the press roller.

When the stamp drum 326 is rotated by half revolution, the sensor light path open signal is inputted from the photo-interrupter 339 to the control circuit 334, thereby detecting the fact that the stamp drum 326 assumes the rotation angle upon waiting again. On the basis of the inputted signal, the control circuit 334 rotates the stamp drum 326 by the predetermined given angle and then stops the stamp drive motor 333. Further, the stamp drum 326 is stopped and fixed to the rotation angle upon waiting until the next stamp operation is started. The gap α is formed again between the downwardly directed cut-out portion and the press roller 327, and the stamped sheet passes through the gap α for discharging.

In this way, every stamp operation start timing of the control circuit 334, the stamp drum 326 is rotated intermittently by half revolution, and two stamp members A, B alternately acts on the recorded sheets successively introduced from the image recording apparatus 310 to the stamping apparatus 320, thereby effecting the stamping operations successively.

By changing the setting of the counter B operated when the tip end of the sheet is detected by the second sheet detect sensor 324, the drive start timing of the stamp drum 326 can be changed, and accordingly, the stamp position in the sheet conveying direction can be changed. Further, the stamp position in a direction perpendicular to the sheet conveying direction can be changed by shifting the stamp unit 340 along the cross shafts 342.

(e) Ink Coating Function

In some cases, the seal stamped on the recorded sheet firstly introduced into the stamping apparatus as mentioned above becomes thin. The reason is that, although the stamp member acting on the firstly introduced recorded sheet was coated by the ink by contacting with the ink roller in the last stamp operation in the previous use of the apparatus, if a long time period is elapsed from the previous use of the apparatus, the ink on the stamp member will be dried substantially.

In the apparatus according to the illustrated embodiment, if it is considered that the long time period is elapsed from the previous use of the apparatus, when the apparatus is used again, the stamp unit 340 is lifted in opposition to its own weight by hooking the finger to the finger grip to be brought to the escape position as shown in FIG. 16B.

In this condition, a gap β between the stamp drum 326 and the press roller 327 becomes greater than the gap α (between the stamp drum 326 and the press roller 327) obtained when the stamp unit 340 is located in the normal position as shown in FIG. 16A. By providing the greater gap β, even when the stamp drum 326 is rotated as shown in FIG. 16C, the downwardly facing stamp member A does not contact with the press roller 327.

The fact that the stamp unit 340 is lifted to the escape position is detected by the flag 344 and the photo-interrupter 345, and a detection signal is inputted to the control circuit 334. In such a condition, when an ink coat operation switch (depressing switch; FIG. 13) 346 is depressed, a switch ON signal is inputted to the control circuit 334.

In a condition that the detection signal (obtained by detecting the fact that the stamp unit 340 is shifted to the escape position) from the photo-interrupter 345 is inputted to the control circuit, when the switch ON signal from the ink coat operation switch 346 is inputted to the control circuit 334, the control circuit rotates the stamp drive motor 333 to rotate the stamp drum 326 by half revolution as shown in FIGS. 16B→16C→16D. As a result, the stamp member B is rotated while contacting with the ink roller 328, so that the ink is coated on the stamp member B uniformly.

While the stamp drum 326 is being rotated by half revolution, since the downwardly facing stamp member A is not contacted with the press roller 327, the press roller 327 is not contaminated by the ink due to direct contact with the stamp member.

After the stamp drum 326 is rotated by half revolution, the stamp unit 340 is returned to the lowered stable position (normal position) as shown in FIG. 16E. Thereafter, when the recorded sheet is introduced into the stamping apparatus 320 and the stamp operation is effected, since the stamp member B newly coated by the ink acts on the firstly introduced recorded sheet, the seal stamped on the firstly introduced recorded sheet can be prevented from becoming thin.

While the stamp drum 326 is being rotated by half revolution for the stamping operation for the firstly introduced recorded sheet P, the other stamp member A is contacted with the ink roller 328 to be uniformly coated by the ink. Accordingly, when a plurality of sheets are processed continuously, since the ink coating operations are effected (by the contact between the stamp member and the ink roller) in connection with the second and other sheets, there is no problem regarding the dense of the seal.

Only on the basis of the input signal (to the control circuit 334) generated by detecting the fact that the stamp unit 340 is lifted to the escape position is detected by the flag 344 and the photo-interrupter 345, the stamp drum 326 may be rotated by half revolution to coat the ink on the stamp member. In this case, however, even when the stamp unit 340 is lifted in a case where the coating of the ink is not required (for example, jam treatment), the stamp drum 326 is rotated by half revolution, with the result that the user may be disoriented.

To avoid this, in the apparatus according to the illustrated embodiment, as mentioned above, the ink coat operation switch 346 is provided, and, in the condition that the detection signal (obtained by detecting the fact that the stamp unit 340 is shifted to the escape position) from the photo-interrupter 345 is inputted to the control circuit, only when the switch ON signal from the ink coat operation switch 346 is inputted to the control circuit 334, the stamp drum 326 is rotated by half revolution to effect the ink coating operation.

(f) Control of Discharging Speed of Sheet

As mentioned above, the sheet conveying speed of the stamping apparatus 320 is controlled to be equal to the detected speed of the sheet introduced from the image recording apparatus 310 to the stamping apparatus 320. Accordingly, when the speed of the sheet introduced from the image recording apparatus 310 to the stamping apparatus 320 is fast or slow, the sheet conveying speed of the stamping apparatus 320 becomes also fast or slow.

If the sheet is discharged from the stamping apparatus 320 onto the discharge tray 331 at the fast speed, the sheet will be discharged too fast to disorder the discharged sheets, and, if the sheet is discharged from the stamping apparatus 320 onto the discharge tray 331 at the slow speed, the sheet will be remained in the discharge roller pair 329 to disorder the discharged sheets or to cause the sheet jam.

To avoid this, in the illustrated embodiment, the discharging speed of the trail end of the sheet conveyed through the stamping apparatus 320 is automatically adjusted properly to always stabilize the discharging of the sheet from the stamping apparatus 320. That is to say, in the illustrated embodiment, when the sheet introduced from the image recording apparatus 310 into the stamping apparatus 320 is further conveyed, the trail end of the sheet is detected by the second sheet sensor 324, and a detect signal is inputted to the control circuit 334.

The control circuit 334 starts the counting of the counter C on the basis of the detection signal. The counter C serves to effect the counting regarding the discharging timing of the trail end of the sheet to set a changing timing of the discharging speed of the sheet. The contents of the counter C is set to a count value from when the trail end of the sheet is detected by the second sheet detect sensor 324 to when the trail end of the sheet leaves the discharge roller pair 329.

At the time when the counter C is timed up, the control circuit 334 changes and controls the driving speed of the convey drive motor 332 in such a manner that the pair of convey rollers 325, press roller 327 and pair of discharge rollers 329 are rotated at the optimum speed.

That is to say, if the sheet conveying speed of the stamping apparatus 320 before the counter C is timed up is greater than a predetermined speed, at the time when the counter C is timed up, the control circuit 334 decreases such speed and changes and controls the driving speed of the convey drive motor 332 in such a manner that the pair of convey rollers 325, press roller 327 and pair of discharge rollers 329 are rotated at the optimum speed (not too fast). Conversely, if the sheet conveying speed is smaller than the predetermined speed, at the time when the counter C is timed up, the control circuit 334 increases such speed and changes and controls the driving speed of the convey drive motor 332 in such a manner that the pair of convey rollers 325, press roller 327 and pair of discharge rollers 329 are rotated at the optimum speed (not too slow).

In this way, the sheet conveying speed of the image recording apparatus 310 is not changed, but, by changing only the sheet conveying speed of the stamping apparatus 320 during the discharging of the sheet and by changing the driving speed of the stamp means on demand, the discharging of the sheet at the stamping. apparatus can be improved.

Figure 17B:
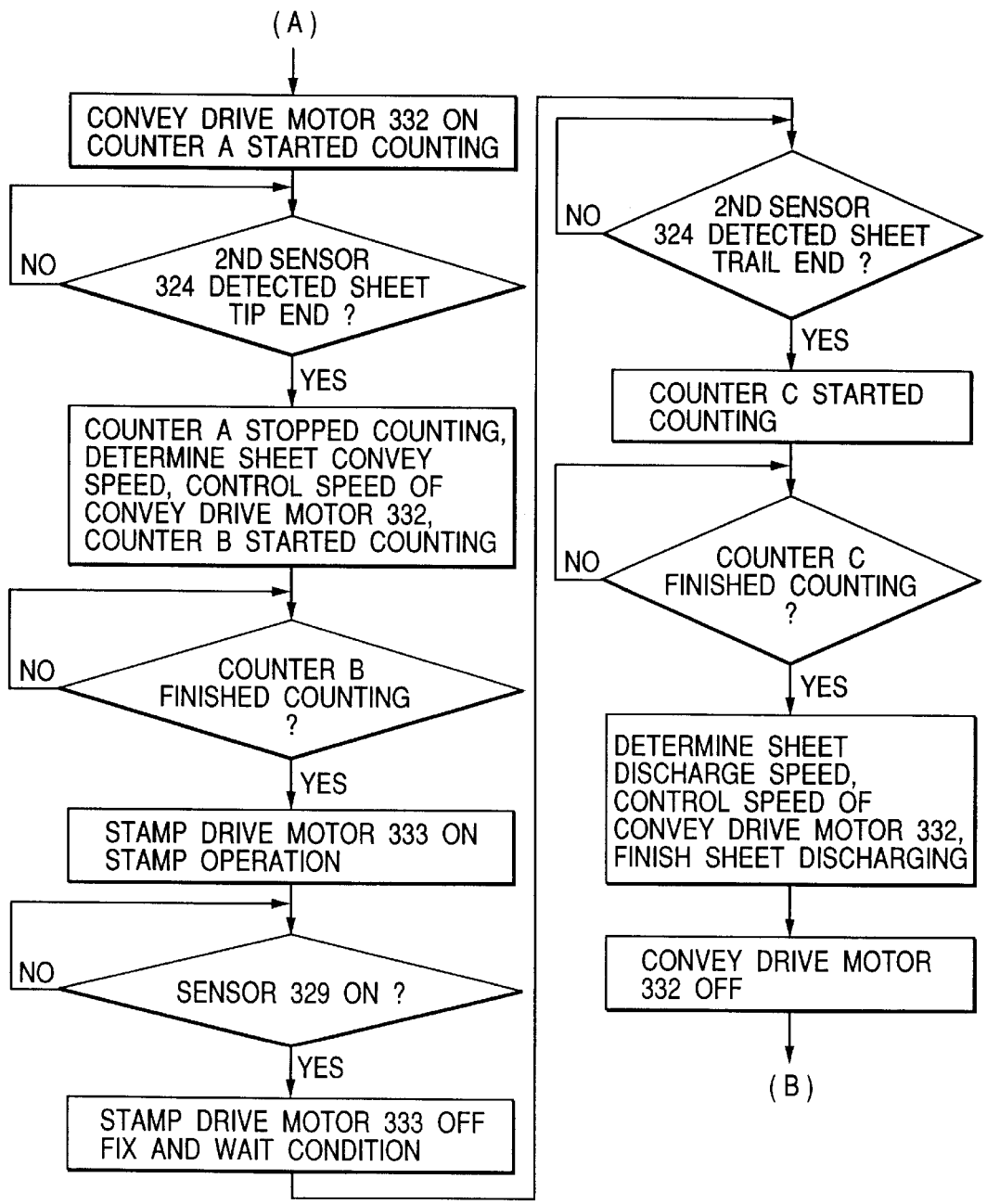
FIG. 17B is a main operation control flow chart (No. 2)
Figure 18:
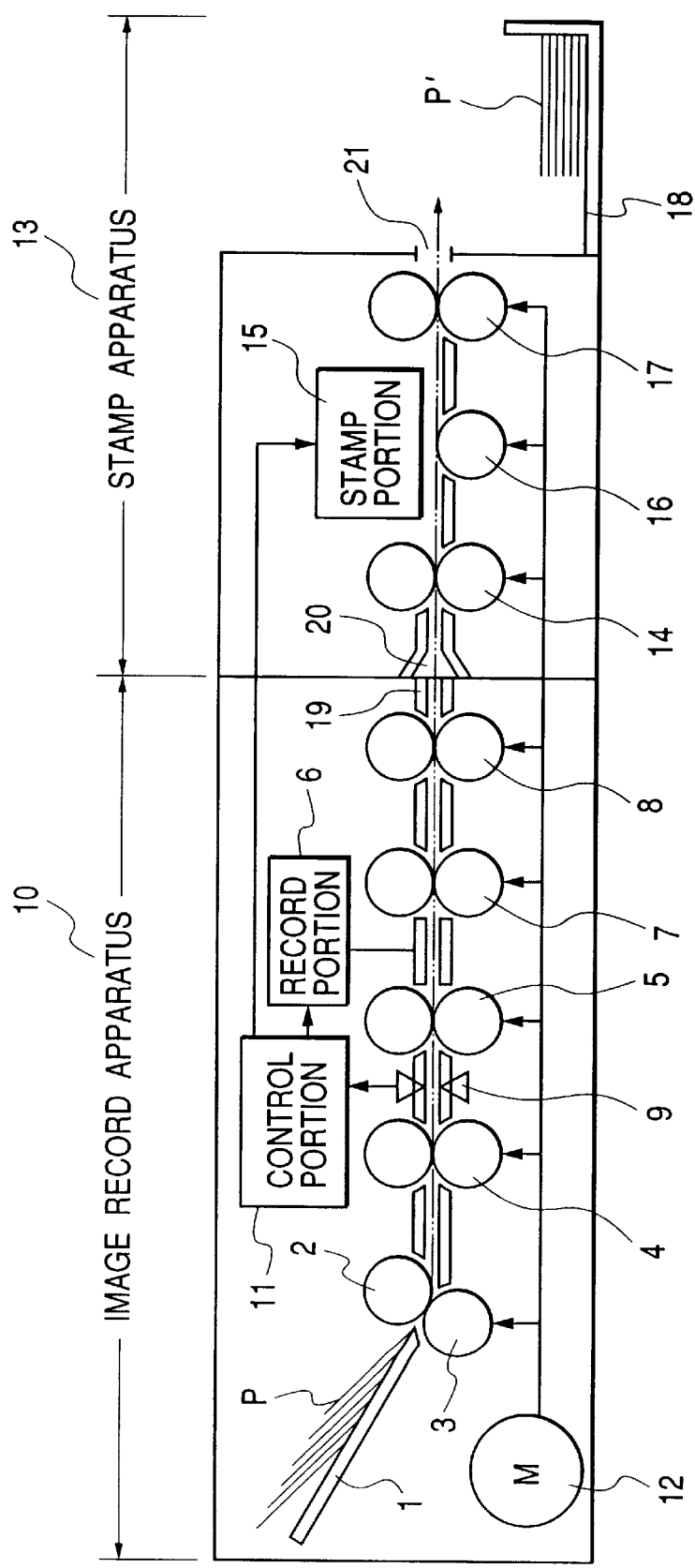
FIG. 18 is a schematic view of a conventional apparatus.

FIGS. 17A and 17B show main flow charts of the stamping apparatus 320 according to the illustrated embodiment.

(g) Others (i) In order to coat the ink on the stamp drum (stamp means) 326, in place of the shifting of the stamp drum 326 from the press roller 327 to the escape position, the press roller 327 may be shifted from the stamp drum 326 to an escape position, or, both the stamp drum 326 and the press roller 327 may be shifted simultaneously to be separated from each other. Further, the position shifting mechanism may be electrically operated by using a solenoid and a cam.

(ii) In a stamping apparatus in which a speed of a sheet supplied to the apparatus is detected and the sheet convey drive means and the stamp drive means are controlled to a convey the sheet at the detected speed, and to effect the stamping operation at the detected speed and the sheet discharging speed is set independently from the sheet conveying speed and the sheet convey drive means or the sheet convey drive means/stamp drive means is controlled to discharge the sheet at the set speed, the stamp means may be constituted by a print mechanism such as an ink jet head, in place of the stamp drum.

(iii) The construction of the stamp drum 326 is not limited to the illustrated ones.

(iv) The stamping apparatus 320 may be permanently attached to the main machine 310 such as an image recording apparatus.

As mentioned above, since the stamping apparatus according to the present invention has the ink coating function for coating the ink on the stamp members of the stamp means on demand, if desired, the ink can be coated on the stamp member to be used for effecting the stamping operation regarding the firstly supplied sheet, thereby preventing the seal stamped on the firstly supplied sheet from becoming thin. Further, since the sheet conveying speed of the apparatus and the sheet discharging speed can be set independently, regardless of the conveying speed (high speed or low speed) of the apparatus, the sheet discharging speed can be changed properly to obtain the optimum sheet discharging speed to the sheet discharge portion.

In addition, since the stamp means has the automatic returning function to the predetermined rotation angle posture upon waiting, if the rotational angle is deviated, the stamp means is automatically returned to the predetermined rotation angle posture upon waiting to correct the rotational deviation, thereby preventing occurrence of any problem due to the rotational deviation.

Furthermore, since the predetermined rotation angle posture of the stamp means upon waiting can be fixed, the stamp means can be prevented from being rotated from the predetermined rotation angle posture due to vibration of the apparatus and the like before the next stamping operation is effected.

What is claimed is:

1. A printing apparatus which can be detachably mounted to an apparatus body of an image processing apparatus and which is driven by a drive source independent of said apparatus body and is effecting printing of a sheet fed out from said apparatus body, said printing apparatus comprising:

sheet detecting means for detecting the presence/absence of the sheet conveyed to a sheet conveying path of the printing apparatus;

sheet conveying means disposed downstream of said sheet detecting means in a conveying direction within said sheet conveying path;

print means for printing on the sheet conveyed by said sheet conveying means; and drive control means for controlling a driving of said sheet conveying means and said print means on the basis of a sheet detecting signal from said sheet detecting means, wherein display means being turned ON and OFF in response to the turning ON and OFF of a power source of said apparatus body is provided on said apparatus body, and said printing apparatus further comprises display detecting means for detecting ON and OFF states of said display means when the printing apparatus is mounted to said apparatus body, and power source control means for controlling a power source of the printing apparatus on the basis of a detection signal from said display detecting means.

2. A printing apparatus according to claim 1, wherein said display detecting means has an optical sensor for detecting light generated when said display means is turned ON.

3. A printing apparatus according to claim 2, wherein, when the light is detected by said optical sensor, the power source of the printing apparatus is turned ON, and, when the light is not detected by said optical sensor, the power source of the printing apparatus is turned OFF.

4. A printing apparatus according to claim 3, wherein said display means includes a light emitting means.

5. A printing apparatus according to claim 2, further comprising second display means, and wherein said second display means is turned ON and OFF on the basis of an output signal of said optical sensor.

6. A printing apparatus comprising:

print means having a stamp member for contacting a sheet to print on the sheet, said print means performing a printing operation while rotating in one direction;

counter means for pinching and conveying the sheet in cooperation with said print means during said printing operation;

ink supply means for coating ink on said stamp member by contacting said stamp member;

position changing means for shifting at least one of said print means and said counter means to an escape position where said print means and said counter means do not contact each other even when said print means is rotated;

detecting means for detecting the relative shifting of said print means and said counter means to said escape position;

a switch for commanding an ink coating operation for said stamp member of said print means; and control means to carry out the ink coating operation for rotating said print means and contacting said ink supply means with said stamp member, when a detection signal from said detecting means is inputted, and when a signal for commanding the ink coating operation is inputted from said switch.

7. A printing apparatus according to claim 6, wherein said print means has a rotatable stamp drum member, said stamp member being provided on said stamp drum member, wherein said stamp drum member comprises a circular arc surface portion on which said stamp member is provided and a cut-out portion.

8. A printing apparatus which can be detachably mounted to an apparatus body of an image processing apparatus and which is driven by a drive source independent of said apparatus body and is effecting printing of a sheet fed out from said apparatus body, said printing apparatus comprising:

sheet detecting means for detecting the presence/absence of the sheet conveyed to a sheet conveying path of the printing apparatus;

sheet conveying means disposed downstream of said sheet detecting means in a conveying direction within said sheet conveying path;

print means for effecting printing on the sheet conveyed by said sheet conveying means; and drive control means for controlling a driving of said sheet conveying means and said print means on the basis of a sheet detecting signal from said sheet detecting means, wherein said sheet detecting means directly connects to said drive control means, wherein said sheet detecting means is disposed downstream of said image processing apparatus in the conveying direction of the sheet.

9. A printing apparatus according to claim 8, wherein said sheet detecting means includes first detecting means for detecting the sheet sent from said apparatus body and second detecting means disposed downstream of said first detecting means in the conveying direction, and wherein a conveying speed of the sheet is detected on the basis of sheet detecting signals from said first and second detecting means, and a sheet conveying speed of said sheet conveying means is controlled on the basis of the detected conveying speed.

10. A printing apparatus according to claim 9, wherein a printing timing of said print means is controlled on the basis of said detected conveying speed.

11. A printing apparatus according to claim 9, wherein said sheet conveying means is driven at a predetermined conveying speed on the basis of sheet detection of said first detecting means, and, after the sheet is detected by said second detecting means, said sheet conveying means is driven at a speed set on the basis of the detected conveying speed.

12. A printing apparatus according to claim 9, wherein, when the sheet is not detected by said second detecting means within a predetermined time period after the sheet is detected by said first detecting means, said printing apparatus determines that a jamming of the sheet has occurred and stops the driving of said sheet convey means and the driving of said print means and indicates an occurrence of the jamming in jam indicating means.

13. A printing apparatus according to claim 9, wherein after said sheet conveying means is driven at the same speed as the detected conveying speed and after a predetermined time period has passed after a trailing end of the sheet passes said first detecting means or said second detecting means, the sheet conveying speed of said sheet conveying means is changed to a predetermined speed.

14. A printing apparatus according to claim 8, wherein said sheet conveying means and said print means are driven on the basis of the sheet detecting signal from said sheet detecting means.

15. A printing apparatus which can be detachably mounted to an apparatus body of an image processing apparatus and which is driven by a drive source independent of said apparatus body and is effecting printing of a sheet fed out from said apparatus body, said printing apparatus comprising:

sheet detecting means for detecting the presence/absence of the sheet conveyed to a sheet conveying path of the printing apparatus;

sheet conveying means disposed downstream of said sheet detecting means in a conveying direction within said sheet conveying path;

print means for effecting printing on the sheet conveyed by said sheet conveying means; and drive control means for controlling a driving of said sheet conveying means and said print means on the basis of a sheet detecting signal from said sheet detecting means, wherein said sheet detecting means directly connects to said drive control means, wherein said printing apparatus is not electrically connected to said image processing apparatus and any other controlling devices so that said printing apparatus is independently operable.

* * * * *

UNITED STATES PATENT AND TRADEMARK OFFICE
CERTIFICATE OF CORRECTION

PATENT NO.   : 6,328,394 B1
DATED        : December 11, 2001
INVENTOR(S)  : Masahiro Shirai et al.

It is certified that error appears in the above-identified patent and that said Letters Patent is hereby corrected as shown below:

<u>Title page,</u>
Item [57], ABSTRACT,
Line 2, "detachably" should read -- detachably be --;
Line 6, "having a sheet detect mechanism" should read -- including a sheet detector --;
Line 8, "convey mechanism" should read -- conveyor --;
Line 9, "detect mechanism" should read -- detector --;
Line 10, "print mechanism" should read -- printer --;
Line 11, "convey" should read -- conveyor, --;
Line 12, "mechanism, and a drive control mechanism" should read -- and a drive controller --;
Line 13, "convey mechanism and the print mecha-" should read -- conveyor and the printer --;
Line 14, "nism on the basis of a sheet detect" should read -- on the basis of a sheet-detect --; and
Line 15, "detect mechanism." should read -- detector. --.

<u>Column 1,</u>
Line 6, "which can" should read -- that can be --;
Line 9, "an option equipment and which" should read -- optional equipment and that --;
Line 17, "share" should read -- share, --;
Line 19, "scanner" should read -- scanner, --;
Line 22, "performed," should read -- performed --;
Line 23, "contents" should read -- data --;
Line 24, "date" should read -- date, --;
Line 29, "original" should read -- original that --;
Line 34, "an" should be deleted;
Line 35, "option equipment which can detachably" should read -- optional equipment that can detachably be --;
Line 36, "user" should read -- user, --;
Line 37, "sheet discharge" should read -- sheet-discharge --;
Line 38, "In a" should read -- When --;
Line 39, "condition that" should be deleted;
Lines 40 and 49, "sheet supply" should read -- sheet-supply --;
Line 41, "sheet dis-" should read -- sheet-dis- --;
Line 43, "communicate both apparatuses 10, 13 with each other." should read -- allow communication between both apparatuses 10, 13. --;
Line 46, "checks" should read -- checks, --;
Line 47, "record start" should read -- record-start --;
Line 52, "sheet convey" should read -- sheet-convey --;
Line 61, "disc" should read -- disc, --; and
Line 63, "P" should read -- P that has --.

UNITED STATES PATENT AND TRADEMARK OFFICE
CERTIFICATE OF CORRECTION

PATENT NO.     : 6,328,394 B1
DATED          : December 11, 2001
INVENTOR(S)    : Masahiro Shirai et al.

It is certified that error appears in the above-identified patent and that said Letters Patent is hereby corrected as shown below:

Column 2,
Line 2, "sheet convey" should read -- sheet-convey --;
Line 8, "contents is" should read -- data are --;
Line 15, "sheet" should read -- sheet- --;
Line 19, "sheet tip end" should read -- sheet-tip-end --;
Line 21, "record start" should read -- record-start --;
Line 23, "stamp start" should read -- stamp-start --;
Line 25, "7 and" should read -- 7, and --;
Line 29, "16 and" should read -- 16, and --;
Line 33, "sheet conveying" should read -- sheet-conveying --;
Line 37, "13 as the option" should read -- 13, as the optional --; and "above" should read -- above, --;
Line 44, "stamp" should read -- stamp- --;
Lines 45 and 46, "sheet detect" should read -- sheet-detect --;
Line 47, "it is difficult that" should read -- the fact --;
Line 49, "omitted." should read -- omitted presents a difficulty. --;
Line 50, "option" should read -- optional --;
Line 54, "(between" should read -- between --;
Line 55, "apparatus 13)" should read -- apparatus 13 --;
Line 56, "are omitted. And, to" should read -- be omitted. To --; and
Line 64, "when" should read -- then, when --; and "since" should read -- because --.

Column 3,
Line 1, "And, it is apt to forget" should read -- It is often forgotten --;
Line 3, "only" should be deleted;
Line 4, "P" should read -- P, --;
Line 6, "apparatus 13" should read -- apparatus 13, --;
Line 8, "13 since" should read -- 13, because --;
Line 10, "since" should read -- because --;
Line 11, "check or the like, it is not preferable" should read -- check, or the like, it is not undesirable --;
Line 13, "a" should read -- the --;
Line 14, "sheet conveying speed" should read -- the sheet conveying speed, --;
Line 15, "a reading resolving" should read -- the reading-resolving --;
Line 17, "image," should read -- image. --;
Line 18, "and, also" should read -- Additionally, --;
Lines 19, 44 and 46, "sheet conveying" should read -- sheet-conveying --;
Line 20, "stamp start" should read -- stamp-start --;
Line 21, "sheet discharging" should read -- sheet-discharging --;
Line 29, "an option equipment which" should read -- optional equipment, which can be --;
Line 31, "apparatus" should read -- apparatus, --;
Lines 32 and 50, "machine" should read -- machine, --;

UNITED STATES PATENT AND TRADEMARK OFFICE
CERTIFICATE OF CORRECTION

PATENT NO. : 6,328,394 B1
DATED : December 11, 2001
INVENTOR(S) : Masahiro Shirai et al.

It is certified that error appears in the above-identified patent and that said Letters Patent is hereby corrected as shown below:

Column 3 (cont'd),
Line 33, "apparatus are not required" should read -- apparatus, are not required, --;
Lines 38 and 49, "which" should read -- that --;
Line 39, "occurrence of sheet jam caused by forgetting power ON of" should read -- the occurrence of a sheet jam caused by forgetting to turn power ON at --;
Line 42, "an option equipment which" should read -- optional equipment that can be --;
Line 45, "drive start" should read -- drive-start --;
Line 51, "apparatus is jammed, a" should read -- apparatus, is jammed, the --;
Line 57, "which" should read -- that --; and "machine" should read -- machine, --;
Line 58, "apparatus and which" should read -- apparatus, and that --;
Line 61, "sheet detect means for detecting" should read -- sheet-detect means for detecting the --;
Lines 63, 66 and 67, "sheet convey" should read -- sheet-convey --;
Line 64, "sheet detect means in a sheet conveying" should read -- sheet-detect means in a sheet-conveying --; and
Line 65, "sheet convey" should read -- sheet-convey --; and "print" should read -- printing --.

Column 4,
Lines 1, 2, 28, 37 and 50, "sheet detect" should read -- sheet-detect --;
Lines 3 and 43, "an option" should read -- optional --;
Lines 4 and 44, "invention" should read -- invention, --;
Line 6, "apparatus" should read -- apparatus, --;
Lines 7, 29, 32, 33, 39, 41 and 52, "sheet convey" should read -- sheet-convey --;
Line 8, "sheet detect signal from the sheet" should read -- sheet-detect signal from the sheet- --;
Line 9, "detecting" should read -- detecting the --;
Lines 11 and 56, "(between" should read -- between --;
Lines 12 and 57, "apparatus 13)" should read -- apparatus 13 --;
Line 30, "sheet detect means in the sheet conveying" should read -- sheet-detect means in the sheet-conveying --;
Line 31, "print" should read -- printing --;
Line 34, "Wherein, the" should read -- The --;
Line 38, "sheet detect means" should read -- sheet-detect means and --;
Line 45, "machine" should read -- machine, --;
Line 46, "apparatus has the" should read -- apparatus, has a --;
Line 47, "independently" should read -- independent --;
Line 54, "sheet" should read -- sheet- --; and
Line 61, "expert" should read -- expert, --.

UNITED STATES PATENT AND TRADEMARK OFFICE
CERTIFICATE OF CORRECTION

PATENT NO.    : 6,328,394 B1
DATED         : December 11, 2001
INVENTOR(S)   : Masahiro Shirai et al.

It is certified that error appears in the above-identified patent and that said Letters Patent is hereby corrected as shown below:

Column 5,
Lines 10 and 19, "an" should be deleted;
Line 11, "apparatus;" should read -- apparatus of FIG. 2; --;
Line 17, "is" should read -- is a --;
Line 20, "apparatus;" should read -- apparatus of FIG. 10; --;
Line 26, "showing" should read -- showing the --;
Line 49, "becomes" should read -- becomes usable in --;
Line 52, "lightened" should read -- lit --;
Line 54, "is consti-" should be deleted;
Line 55, "tuted by an LED lamp 121," should read -- includes an LED lamp 121 --;
Line 58, "guide regulating" should read -- guide-regulating --;
Line 61, "sheet conveying" should read -- sheet-conveying --; and
Lines 66 and 67, "sheet supply" should read -- sheet-supply --.

Column 6,
Line 1, "checks" should read -- checks, --;
Line 4, "guide regulating" should read -- guide-regulating --;
Line 6, "sheet supply tray 111. When the sheets are" should read -- sheet-supply tray 111. When larger sheets are used, --;
Line 7, "further large," should be deleted;
Line 10, "sheet" should read -- sheet- --;
Lines 14, 19, 23, 29, 32 and 33, "sheet convey" should read -- sheet-convey --;
Line 16, "regist" should read -- register --;
Line 28, "larger size" should read -- larger-sized --;
Lines 31 and 34, "image reading" should read -- image-reading --;
Line 35, "image" should read -- images --;
Line 36, "image" should read -- image- --;
Line 41, "disc" should read -- disc, --;
Lines 44 and 47, "sheet detect" should read -- sheet-detect --;
Line 46, "regist rollers 104 in the sheet convey" should read -- register rollers 104 in the sheet-convey --;
Line 49, "drive start timing of the regist" should read -- drive-start timing of the register --;
Line 50, "a read start" should read -- read-start --; and
Line 61, "perspective view and" should read -- a perspective view and a --.

Column 7,
Line 5, "with" should read -- while --;
Line 7, "wardly and a" should read -- wardly. A --;
Line 12, "lower edge portions of" should read -- the lower edge portions of the --;
Lines 40 and 57, "In a condition that" should read -- When --;
Lines 42, 46 and 51, "sheet receiving" should read -- sheet-receiving --;
Line 52, "as" should read -- an --;

UNITED STATES PATENT AND TRADEMARK OFFICE
CERTIFICATE OF CORRECTION

PATENT NO.   : 6,328,394 B1
DATED        : December 11, 2001
INVENTOR(S)  : Masahiro Shirai et al.

It is certified that error appears in the above-identified patent and that said Letters Patent is hereby corrected as shown below:

Column 7 (cont'd),
Lines 54 and 67, "light receive" should read -- light-receive --;
Line 59, "221a" should read -- 221a that --; and
Line 65, "lighten" should read -- light --.

Column 8,
Line 5, "an" should be deleted;
Line 8, "power supply plug socket as option so that an" should read -- power-supply-plug socket as an option so that --;
Line 10, "power supply" should read -- power-supply --;
Line 13, "the" should be deleted;
Line 15, "200 including the light receive" should read -- 200, including the light-receive --;
Line 16, "small." should read -- low. --;
Line 20, "lightened, the light receive" should read -- lit, the light-receive --;
Line 21, "receive" should read -- receive light --;
Lines 23, 34, 64 and 67, "light receive" should read -- light-receive --;
Line 32, "lightened," should read -- lit, --;
Line 37, "(drive stop" should read -- (drive-stop --;
Line 38, "(drive wait" should read -- (drive-wait --;
Lines 40 and 56, "lightened." should read -- lit. --;
Line 42, "embodiment" should read -- embodiment, --;
Line 49, "it is said that the power sources of both of" should read -- the power sources of --;
Line 51, "conditions" should read -- condition --;
Line 53, "lightened" should read -- lit --; "both of" should be deleted; and
Line 59, "lighten" should read -- light --.

Column 9,
Line 4, "since" should be deleted;
Line 6, "(drive wait" should read -- (drive-wait --;
Line 7, "(drive stop" should read -- (drive-stop --;
Line 20, "apparatus 200." should read -- apparatus 200 is also prevented. --;
Line 22, "In the condition that" should read -- When --;
Line 28, "checks" should read -- checks, --;
Line 29, "sheet supply" should read -- sheet-supply --;
Line 34, "and," should read -- and --;
Lines 36, 37 and 41, "sheet receiving" should read -- sheet-receiving --;
Line 39, "sheet detect" should read -- sheet-detect --;
Lines 42, 46 and 59, "tip end detect" should read -- tip-end-detect --;
Lines 48 and 61, "(sheet conveying" should read -- (sheet-conveying --; and
Line 52, "sheet" should read -- sheet that --.

UNITED STATES PATENT AND TRADEMARK OFFICE
CERTIFICATE OF CORRECTION

PATENT NO.    : 6,328,394 B1
DATED         : December 11, 2001
INVENTOR(S)   : Masahiro Shirai et al.

It is certified that error appears in the above-identified patent and that said Letters Patent is hereby corrected as shown below:

Column 10,
Line 5, "seal" should read -- a seal --;
Line 8, "rested" should read -- placed --;
Line 25, "rotation driving" should read -- rotation-driving --;
Line 35, "is" should read -- is referred to as the --;
Line 37, "the" (third occurrence) should read -- a --;
Line 38, "is passed through the gap not to" should read -- passed through the gap will not --;
Line 39, "by" should read -- by a --;
Line 45, "encoder 218" should read -- encoder 218, which is --;
Line 47, "sheet conveying" should read -- sheet-conveying --;
Line 48, "a" should read -- the --;
Line 49, "sheet" (second occurrence) should read -- sheet- --;
Line 56, "light amount detect signal from the light" should read -- light-amount-detect signal from the light- --;
Line 58, "(drive stop" should read -- (drive-stop --;
Line 59, "(drive wait mode) and lightens the emit" should read -- (drive-wait mode) and lights the emit- --;
Line 61, "convey drive" should read -- convey-drive --;
Line 62, "stamp drive" should read -- stamp-drive --;
Line 63, "sheet tip end" should read -- sheet-tip-end --;
Line 64, "sheet detect means (sheet detect" should read -- sheet-detect means (sheet-detect --; and
Line 65, "sheet convey" should read -- sheet-convey --.

Column 11,
Line 4, "such as" should read -- such. For --;
Line 6, "photo-" should read -- photographically --;
Line 7, "taking" should read -- recording --; and "film" should read -- film, --;
Line 10, "an option" should read -- optional --;
Line 11, "machine" should read -- machine, --;
Line 12, "apparatus" should read -- apparatus, --;
Line 17, "any" should read -- an --;
Line 19, "can be" should read -- is --;
Line 21, "shows" should read -- show --;
Line 22, "same as" should read -- identical to --;
Line 26, "reading resolving" should read -- reading-resolving --;
Lines 28 and 58, "(sheet conveying" should read -- (sheet-conveying --;
Lines 34, 50 and 67 "sheet detect" should read -- sheet-detect --;
Lines 35, 37, 54 and 57, "sheet" should read -- sheet- --;
Line 39, "sheet conveying" should read -- sheet-conveying --;
Line 41, "P" should read -- P that --;

UNITED STATES PATENT AND TRADEMARK OFFICE
CERTIFICATE OF CORRECTION

PATENT NO. : 6,328,394 B1
DATED : December 11, 2001
INVENTOR(S) : Masahiro Shirai et al.

It is certified that error appears in the above-identified patent and that said Letters Patent is hereby corrected as shown below:

Column 11 (cont'd),
Line 44, "sheet detect sensors 203, 204, and sheet tip end" should read -- sheet-detect sensors 203, 204, and sheet-tip-end- --;
Line 45, "defect" should read -- detect --;
Line 48, "sheet tip end detect signal from the first sheet" should read -- sheet-tip-end-detect signal from the first sheet- --;
Line 49, "sheet tip end detect" should read -- sheet-tip-end-detect --; and
Line 62, "sheet con-" should read -- sheet-con- --.

Column 12,
Line 1, "second sheet detect sensor 204 as short as possible, a" should read -- second sheet-detect sensor 204 to be short as possible, the --;
Line 11, "sheet detect" should read -- sheet-detect --;
Line 15, "controls to change" should read -- changes --;
Line 18, "sheet con-" should read -- sheet-con- --;
Line 19, "that," should read -- that --;
Line 21, "for changing" should read -- that --;
Line 23, "206." should read -- 206 be changed. --;
Line 26, "tip end detect signal from the second sheet detect" should read -- tip-end-detect signal from the second sheet-detect --;
Line 29, "(sheet conveying" should read -- (sheet-conveying --;
Line 41, "seal" should read -- a seal --;
Line 45, "rested" should read -- placed --; and
Line 49, "apparatus 200." should read -- apparatus 200 as described with reference to FIG. 10. --.

Column 13,
Line 2, "is" should read -- is referred to as --;
Line 3, "the" (second occurrence) should read -- a --;
Line 4, "is" should be deleted;
Line 5, "not to" should read -- will not --;
Line 7, "218 set" should read -- 218, which is set --;
Line 9, "by" should read -- by a --;
Line 14, "(n the sheet conveying" should read -- (in the sheet-conveying --;
Line 16, "a" should read -- the --;
Lines 17, 43, 44, 46 and 48, "sheet detect" should read -- sheet-detect --;
Line 22, "sheet conveying speed of the sheet convey" should read -- sheet-conveying speed of the sheet-convey --;
Line 23, "apparatus 100," should read -- apparatus 200, --;
Line 25, "drive start" should read -- drive-start --;
Line 26, "is" should read -- be --;
Line 27, "sheet conveying" should read -- sheet-conveying --;

UNITED STATES PATENT AND TRADEMARK OFFICE
CERTIFICATE OF CORRECTION

PATENT NO.    : 6,328,394 B1
DATED         : December 11, 2001
INVENTOR(S)   : Masahiro Shirai et al.

It is certified that error appears in the above-identified patent and that said Letters Patent is hereby corrected as shown below:

Column 13 (cont'd),
Line 34, "sheet tip end detect" should read -- sheet-tip-end-detect --; and "sheet" (second occurrence) should read -- sheet- --;
Line 45, "any reason. Alternately," should read -- some reason. Alternatively, --; and
Line 58, "lightened" should read -- lit --.

Column 14,
Line 2, "light amount detect signal from the light" should read -- light-amount-detect signal from the light- --;
Line 4, "(drive stop" should read -- (drive-stop --;
Line 5, "(drive wait mode) and lightens the emit" should read -- (drive-wait mode) and lights the emit- --;
Line 7, "sheet tip end detect" should read -- sheet-tip-end-detect --;
Line 8, "sheet detect" should read -- sheet-detect --; and "sheet tip end detect" should read -- sheet-tip-end-detect --;
Lines 9 and 23, "sheet detect" should read -- sheet-detect --;
Line 14, "And, the" should read -- The --;
Line 15, "convey drive" should read -- convey-drive --;
Lines 16 and 21, "stamp drive" should read -- stamp-drive --;
Line 17, "sheet conveying speed" should read -- sheet-conveying speed, --;
Line 18, "sheet convey" should read -- sheet-convey --;
Line 22, "sheet" should read -- sheet- --;
Line 25, "lightens the emit display" should read -- lights the emit-display --;
Lines 28 and 54, "an option" should read -- optional --;
Line 35, "in" (second occurrence) should be deleted;
Line 36, "which the sheet conveying speed and the drive start timing" should read -- the sheet-conveying speed and the drive-start timing --;
Line 38, "sheet conveying" should read -- sheet-conveying --;
Line 40, "which" should read -- which can be provided that --;
Line 41, "which" should read -- which, --;
Line 42, "jammed" should read -- jammed, --;
Line 43, "cam" should be deleted;
Line 44, "jam can be provided." should read -- jam. --;
Line 45, "and" should read -- and prevention of the --;
Line 46, "jam" should read -- jams --;
Line 47, "can be prevented" should be deleted;
Line 59, "In a condition that" should read -- When --;
Line 60, "sheet supply" should read -- sheet-supply --;
Line 62, "sheet discharge" should read -- sheet-discharge --;
Line 63, "communicate both apparatuses 310, 320" should read -- allow communication between both apparatuses 310, 320. --; and

UNITED STATES PATENT AND TRADEMARK OFFICE
CERTIFICATE OF CORRECTION

PATENT NO.    : 6,328,394 B1
DATED         : December 11, 2001
INVENTOR(S)   : Masahiro Shirai et al.

It is certified that error appears in the above-identified patent and that said Letters Patent is hereby corrected as shown below:

<u>Column 14 (cont'd),</u>
Line 64, "with each other." should be deleted.

<u>Column 15,</u>
Line 2, "an" should be deleted;
Line 5, "checks" should read -- checks, --;
Lines 6 and 7 and 53, "sheet supply" should read -- sheet-supply --;
Lines 13, 21, 24 and 26, "regist" should read -- register --;
Lines 15 and 19, "sheet detect" should read -- sheet-detect --;
Line 18, "regist" should read -- register --; and "sheet tip end detect" should read
-- sheet-tip-end-detect --;
Line 34, "on" (second occurrence) should read -- from --;
Line 35, "disc" should read -- disc, --;
Line 37, "sheet" should read -- sheet that is --;
Line 49, "apparats" should read -- apparatus --;
Line 50, "apparatus 200," should read -- apparatus 320, --;
Line 56, "sheet supply roller 302, pair" should read -- sheet-supply roller 302, a pair --;
Line 57, "pair of regist rollers 305, pair" should read -- a pair of register rollers 305, a pair --;
Line 58, "308 and pair" should read -- 308, and a pair --;
Line 59, "systems (not shown) such as" should read -- system (not shown) such as a system of --;
Line 61, "ON/OFF control and speed control" should read -- The ON/OFF condition and the speed --;
Line 62, "effected" should read -- controlled --; and "sheet conveying" should read
-- sheet-conveying --;
Line 64, "plural" should read -- a plurality of --;
Line 65, "value" should read -- value, --; and
Line 67, "power" should read -- power, --.

<u>Column 16,</u>
Line 12, "provided" should read -- driven --;
Line 13, "machine) 100" should read -- machine) 310 --;
Line 14, "sheet conveying" should read -- sheet-conveying --; and "sheet discharg-" should read -- sheet-discharg- --;
Line 16, "sheet conveying" should read -- sheet-conveying --;
Line 17, "apparatus 100." should read -- apparatus 310. --;
Line 20, "an" should be deleted;
Line 25, "sheet supply" should read -- sheet-supply --;
Line 27, "sheet detect sensor 323, a second sheet" should read -- sheet-detect sensor 323, a second sheet- --.

UNITED STATES PATENT AND TRADEMARK OFFICE
CERTIFICATE OF CORRECTION

PATENT NO. : 6,328,394 B1
DATED : December 11, 2001
INVENTOR(S) : Masahiro Shirai et al.

It is certified that error appears in the above-identified patent and that said Letters Patent is hereby corrected as shown below:

Column 16 (cont'd),
Line 29, "means) 326" should read -- means) 326, --;
Line 31, "And, an" should read -- An --;
Line 33, "convey drive" should read -- convey-drive --;
Line 34, "roller 327" should read -- roller 327, --;
Lines 43 and 53, "sheet detect" should read -- sheet-detect --;
Line 45, "convey drive" should read -- convey-drive --;
Line 47, "press roller 327" should read -- the press roller 327, --;
Line 48, "and" should read -- and the --;
Line 49, "of" should read -- using --;
Line 50, "a" should read -- the --;
Line 59, "contents of the counter," should read -- numerical value of the counter A, --;
Line 61, "press roller 327 and" should read -- the press roller 327, and the --; and
Line 62, "sheet" should read -- sheet- --.

Column 17,
Line 1, "same as" should read -- equal to --;
Lines 4 and 32, "of" should read -- using --;
Line 5, "tip end" should read -- tip-end- --;
Lines 6, 10, 29, 35 and 40, "sheet detect" should read -- sheet-detect --;
Line 7, "drive start" should read -- drive-start --;
Line 8, "contents of the counter B is set" should read -- numerical value of the counter B is set to --;
Line 14, "by" should read -- by a --;
Line 23, "speed same" should read -- same speed --;
Line 34, "sheet trail end" should read -- sheet-trail-end --;
Line 37, "sheet" (second occurrence) should read -- sheet- --;
Line 38, "contents" should read -- numerical value --;
Line 43, "convey drive" should read -- convey-drive --;
Line 59, "comprised of" should read -- comprising --;
Line 60, "drive shaft 326*a*, gear 337," should read -- a drive shaft 326*a*, a gear 337, an --;
Line 61, "338, stamp drive motor 333, drive gear 336, photo-" should read -- 338, a stamp-drive motor 333, a drive gear 336, a photo- --; and
Line 62, "sand" should read -- and an --.

Column 18,
Line 22, "light receiving" should read -- light-receiving --;
Line 38, "sensor light" should read -- sensor-light --;
Line 39, "path open" should read -- path-open --;
Line 46, "same" should read -- identical --;
Line 47, "two each other" should read -- to each other, --; and
Line 67, "sensor light" should read -- sensor-light- --.

UNITED STATES PATENT AND TRADEMARK OFFICE
CERTIFICATE OF CORRECTION

PATENT NO. : 6,328,394 B1
DATED : December 11, 2001
INVENTOR(S) : Masahiro Shirai et al.

It is certified that error appears in the above-identified patent and that said Letters Patent is hereby corrected as shown below:

Column 19,
Line 1, "path open" should read -- path-open --;
Line 2, "is" should read -- into --;
Line 5, "sensor light path" should read -- sensor-light-path- --;
Line 8, "at that time" should read -- then --;
Line 13, "being deviated" should read -- deviating --;
Line 27, "sensor" should read -- sensor- --;
Line 28, "light path block" should read -- light-path-block --;
Line 32, "waits" should read -- awaits --;
Line 33, "sensor light path open" should read -- sensor-light-path-open --; and
Line 39, "motor 332" should read -- motor 333 --.

Column 20,
Line 5, "with" should be deleted;
Lines 12 and 27, "by" should read -- by a --;
Line 13, "sensor light path open" should read -- sensor-light-path-open --;
Line 28, "acts" should read -- act --;
Line 33, "sheet detect" should read -- sheet-detect --;
Line 34, "drive start" should read -- drive-start --;
Line 35, "sheet" should read -- sheet- --;
Line 37, "sheet conveying" should read -- sheet-conveying --;
Lines 42 and 44, "firstly" should read -- first --; and
Line 62, "not" should read -- not make --.

Column 21,
Line 8, "stamp drive" should read -- stamp-drive --;
Lines 24 and 28, "firstly" should read -- first --;
Lines 27, 40, 44 and 54, "by" should read -- by a --;
Line 29, "is" should be deleted;
Line 30, "contacted" should read -- contacts --;
Line 35, "dense" should read -- denseness --;
Line 36, "signal" should read -- signal, --;
Line 38, "is" (second occurrence) should read -- being --;
Line 47, "ink coat operation" should read -- ink-coat-operation --;
Line 48, "in the condition that" should read -- when --;
Line 51, "circuit," should read -- circuit, and --;
Line 63, "sheet conveying" should read -- sheet-conveying --;
Line 64, "becomes also" should read -- also becomes --; and
Line 67, "too fast" should read -- so fast as --.

UNITED STATES PATENT AND TRADEMARK OFFICE
CERTIFICATE OF CORRECTION

PATENT NO. : 6,328,394 B1
DATED : December 11, 2001
INVENTOR(S) : Masahiro Shirai et al.

It is certified that error appears in the above-identified patent and that said Letters Patent is hereby corrected as shown below:

Column 22,
Line 3, "be remained" should read -- remain --;
Line 19, "contents" should read -- numerical value --;
Line 21, "sheet detect" should read -- sheet-detect --;
Lines 28, 36, 43 and 45, "sheet conveying" should read -- sheet-conveying --;
Lines 33 and 39, "convey drive" should read -- convey-drive --;
Line 61, "sheet convey" should read -- sheet-convey- --;
Line 62, "stamp drive" should read -- stamp-drive --; and "a" should be deleted;
Line 63, "speed," should read -- speed --;
Line 64, "speed and the sheet" should read -- speed, and the sheet- --;
Line 65, "sheet con-" should read -- sheet-con- --; and
Line 66, "speed and the sheet convey drive" should read -- speed, and the sheet-convey-drive --.

Column 23,
Lines 13 and 14, "firstly" should read -- first --;
Line 16, "sheet conveying" should read -- sheet-conveying --;
Line 18, "sheet discharging" should read -- sheet-discharging --; and
Line 19, "sheet" should read -- sheet- --.

Signed and Sealed this

Fourth Day of October, 2005

JON W. DUDAS
*Director of the United States Patent and Trademark Office*